(12) United States Patent
Matsumoto et al.

(10) Patent No.: US 12,097,785 B2
(45) Date of Patent: Sep. 24, 2024

(54) MOUNTED OBJECT DETECTION DEVICE AND VEHICLE CONTROL SYSTEM

(71) Applicant: Panasonic Intellectual Property Management Co., Ltd., Osaka (JP)

(72) Inventors: Takashi Matsumoto, Osaka (JP); Hiroyuki Furuya, Osaka (JP); Yuta Moriura, Osaka (JP); Hironobu Ukitsu, Osaka (JP); Susumu Uragami, Osaka (JP); Yoshinori Matsui, Nara (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 241 days.

(21) Appl. No.: 17/747,671

(22) Filed: May 18, 2022

(65) Prior Publication Data
US 2022/0274505 A1     Sep. 1, 2022

Related U.S. Application Data

(63) Continuation of application No. PCT/JP2020/035354, filed on Sep. 17, 2020.

(30) Foreign Application Priority Data

Nov. 26, 2019   (JP) ................. 2019-213392

(51) Int. Cl.
*B60N 2/00*     (2006.01)
*B60Q 9/00*     (2006.01)
(Continued)

(52) U.S. Cl.
CPC ............ *B60N 2/002* (2013.01); *B60Q 9/00* (2013.01); *B60R 21/01516* (2014.10); *G01G 19/4142* (2013.01)

(58) Field of Classification Search
CPC .... B60N 2/002; B60Q 9/00; B60R 21/01516; B60R 21/01532; G01G 19/4142; G01L 5/00
(Continued)

(56) References Cited

U.S. PATENT DOCUMENTS

| 6,490,515 | B1 | 12/2002 | Okamura et al. |
| 6,662,138 | B1 | 12/2003 | Takafuji et al. |
| 2002/0024257 | A1 | 2/2002 | Fujimoto et al. |

FOREIGN PATENT DOCUMENTS

| JP | 2000-301980 A | 10/2000 |
| JP | 2001-187541 A | 7/2001 |

(Continued)

OTHER PUBLICATIONS

International Search Report issued in corresponding International Patent Application No. PCT/JP2020/035354, dated Oct. 20, 2020, with English translation.

(Continued)

*Primary Examiner* — Hai H Huynh
(74) *Attorney, Agent, or Firm* — Rimon P.C.

(57) ABSTRACT

A mounted object detection device includes: a load sensor in which a plurality of sensor parts each configured to detect a load are disposed in a matrix shape; and a controller configured to detect a situation of a mounted object on the load sensor on the basis of an output from the load sensor. The controller: detects a load distribution on a detection region of the load sensor on the basis of an output from the load sensor; discerns which of a person and a thing the mounted object is, on the basis of the load distribution; and when having discerned that the mounted object is a thing, discerns whether or not a person or an animal is mounted on the thing, on the basis of temporal change in the load distribution.

12 Claims, 14 Drawing Sheets

(51) Int. Cl.
    *B60R 21/015* (2006.01)
    *G01G 19/414* (2006.01)
(58) Field of Classification Search
    USPC .................................................... 701/45, 49
    See application file for complete search history.

(56) References Cited

FOREIGN PATENT DOCUMENTS

| | | |
|---|---|---|
| JP | 2001-191830 A | 7/2001 |
| JP | 4513190 B2 | 7/2010 |

OTHER PUBLICATIONS

Chinese Office Action dated Dec. 7, 2023 issued in the corresponding Chinese Patent Application No. 202080079525.2.

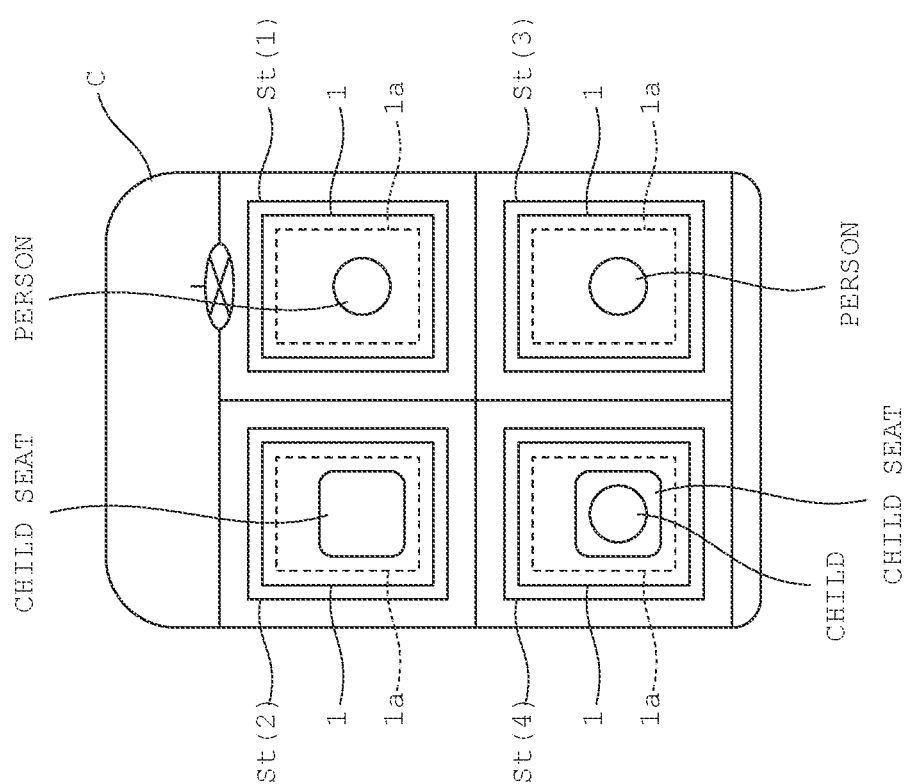
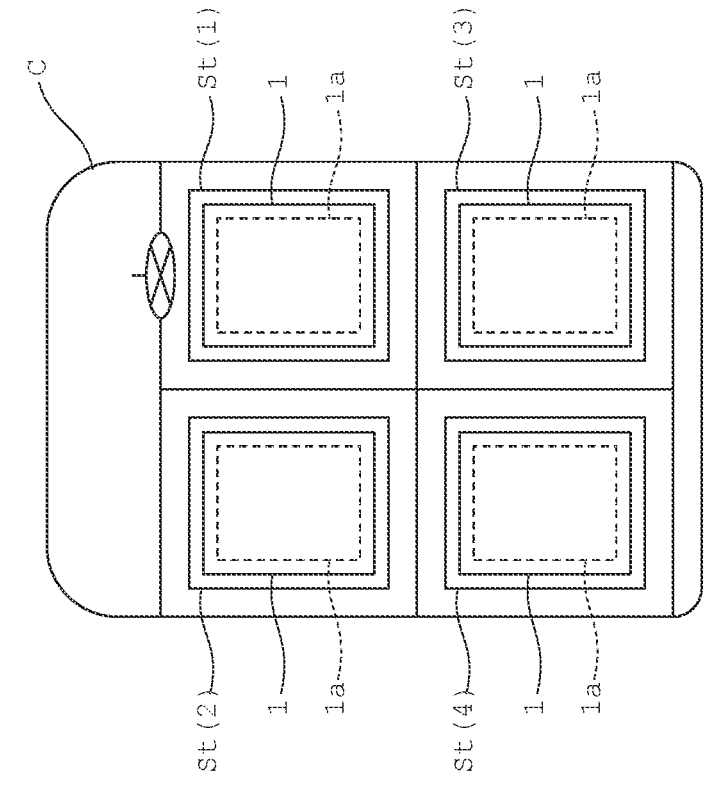

FIG. 9 FIRST PROCESS PERFORMED BY VEHICLE CONTROLLER

FIG.11A

| m | T(m) | NOTIFICATION CONTENT |
|---|---|---|
| 1 | 10 MINUTES | TRANSMIT MAIL TO REGISTERED MAIL ADDRESS |
| 2 | 30 MINUTES | OUTPUT ALARM SOUND TO SURROUNDING |
| 3 | 1 HOUR | TRANSMIT VEHICLE INFORMATION TO POLICE AND AAA |

FIG.11B

MODIFICATION

| m | T(m) | NOTIFICATION CONTENT |
|---|---|---|
| 1 | 5 MINUTES | TRANSMIT MAIL TO REGISTERED MAIL ADDRESS |
| 2 | 20 MINUTES | OUTPUT ALARM SOUND TO SURROUNDING |
| 3 | 40 MINUTES | TRANSMIT VEHICLE INFORMATION TO AAA |
| 4 | 1 HOUR | TRANSMIT VEHICLE INFORMATION TO POLICE |

FIG. 12A

MODIFICATION 1

S104: NO
↓
S111 IS MOVED AMOUNT OF CENTER OF GRAVITY NOT LESS THAN THRESHOLD Dth?
- NO → S109 DETERMINE THAT MOUNTED OBJECT IS THING → END
- YES ↓

S107 IS ACCELERATION IN PREDETERMINED TIME NOT LESS THAN THRESHOLD Ath?
- YES → (loop back to S111)
- NO ↓

S108 DETERMINE THAT MOUNTED OBJECT IS THING HAVING PERSON MOUNTED THEREON → END

FIG. 12B

MODIFICATION 2

S104: NO
↓
S112 IS FREQUENCY REGARDING MOVEMENT NOT GREATER THAN THRESHOLD Fth?
- NO → S109 DETERMINE THAT MOUNTED OBJECT IS THING → END
- YES ↓

S107 IS ACCELERATION IN PREDETERMINED TIME NOT LESS THAN THRESHOLD Ath?
- YES → (loop back to S112)
- NO ↓

S108 DETERMINE THAT MOUNTED OBJECT IS THING HAVING PERSON MOUNTED THEREON → END

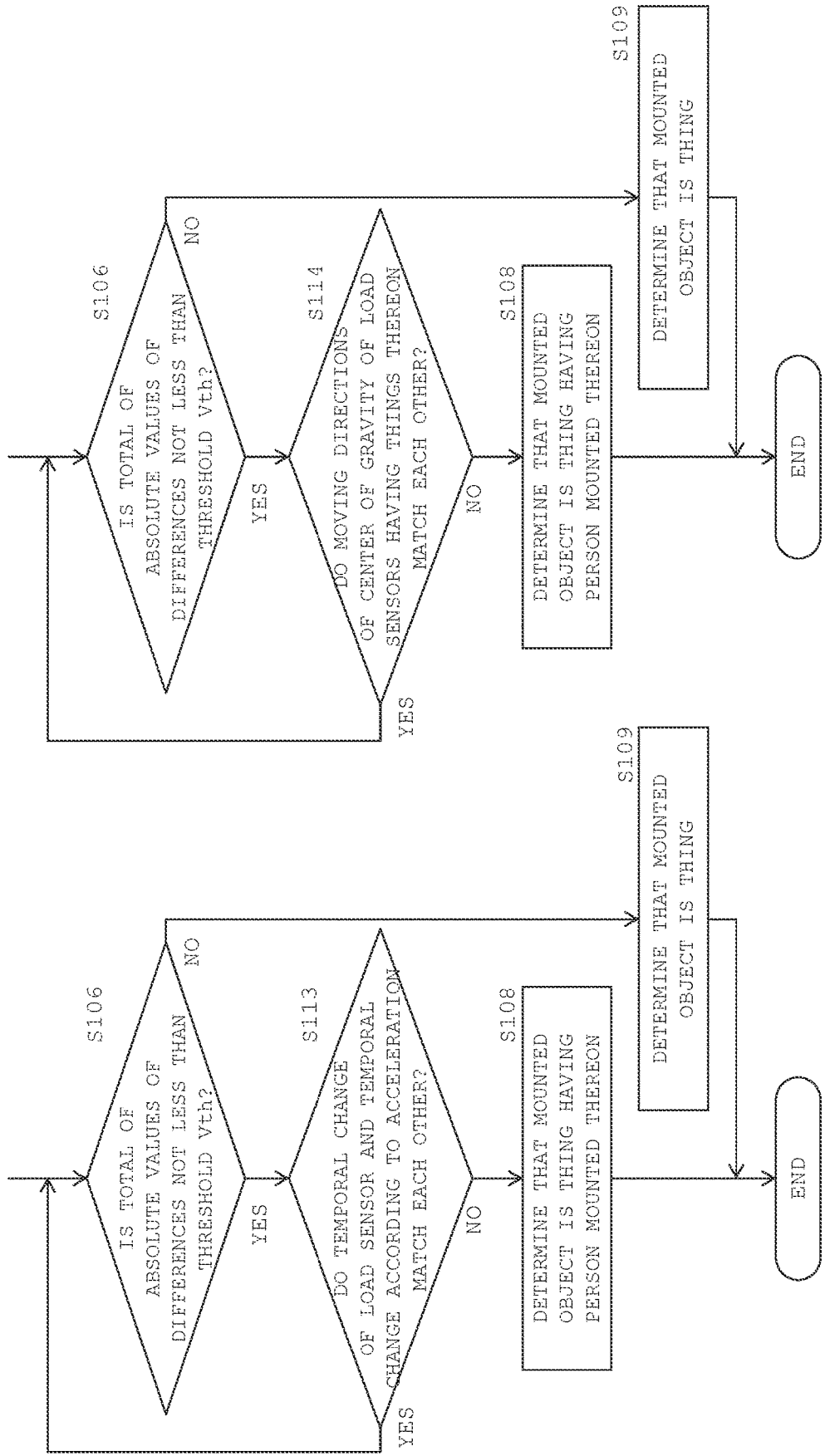

MOUNTED OBJECT DETECTION DEVICE AND VEHICLE CONTROL SYSTEM

CROSS REFERENCE TO RELATED APPLICATION

This application is a continuation of International Application No. PCT/JP2020/035354 filed on Sep. 17, 2020, entitled "MOUNTED OBJECT DETECTION DEVICE AND VEHICLE CONTROL SYSTEM", which claims priority under 35 U.S.C. Section 119 of Japanese Patent Application No. 2019-213392 filed on Nov. 26, 2019, entitled "MOUNTED OBJECT DETECTION DEVICE AND VEHICLE CONTROL SYSTEM". The disclosures of the above applications are incorporated herein by reference.

BACKGROUND OF THE INVENTION

1. Field of the Invention

The present invention relates to: a mounted object detection device that detects the situation of a mounted object on a load sensor by using the load sensor in which a plurality of sensor parts each for detecting a load are disposed in a matrix shape; and a vehicle control system that performs a predetermined control on the basis of a detection result of the mounted object detection device.

2. Disclosure of Related Art

In recent years, load sensors in which a plurality of sensor parts for detecting loads are disposed in a matrix shape have been used in various fields. For example, a sheet-shaped load sensor is disposed at each seat of a vehicle, whereby the situation of an object at the seat can be detected.

Japanese Patent No. 4513190 describes a seated person determination apparatus that includes: a seat sensor in which a plurality of sensor parts are disposed in a matrix shape; and a microcomputer connected to the seat sensor. In this apparatus, the seat sensor is installed in a seat of a vehicle, and on the basis of the distribution of output voltage from all of the sensor parts disposed in a matrix shape, which of an adult, a child, and a child seat a mounted object on the seat sensor is, is determined.

In the apparatus as described above, which of an adult, a child, and a child seat the mounted object on the seat sensor is can be determined, but whether or not a child is sitting on the child seat cannot be further determined. When whether or not a child is sitting on a child seat is detected, a control for children and a control for adults can be switched with each other, for example. This serves as an important factor in safety and the like.

SUMMARY OF THE INVENTION

A first aspect of the present invention relates to a mounted object detection device. The mounted object detection device according to the present aspect includes: a load sensor in which a plurality of sensor parts each configured to detect a load are disposed in a matrix shape; and a controller configured to detect a situation of a mounted object on the load sensor on the basis of an output from the load sensor. The controller: detects a load distribution on a detection region of the load sensor on the basis of an output from the load sensor; discerns which of a person or animal and a thing the mounted object is, on the basis of the load distribution; and when having discerned that the mounted object is a thing, discerns whether or not a person or an animal is mounted on the thing, on the basis of temporal change in the load distribution.

According to the mounted object detection device of the present aspect, whether or not a person or an animal is mounted on a thing is further discerned. Therefore, the situation of the mounted object on the load sensor can be more finely detected. Accordingly, for example, when a child (person) is sitting on a child seat (thing), a control for the child can be smoothly and appropriately performed.

A second aspect of the present invention relates to a vehicle control system. The vehicle control system according to the present aspect includes the mounted object detection device according to the first aspect, and a vehicle controller configured to perform a predetermined control with respect to a vehicle. The load sensor is installed in a seat of the vehicle, and when the vehicle controller has determined that a person or an animal is left in the vehicle, on the basis of a detection result by the mounted object detection device, the vehicle controller executes a control of making notification that a person or an animal is left in the vehicle, to outside of the vehicle.

According to the vehicle control system of the present aspect, that a child, an animal, or the like is left in a vehicle is notified of. Similar to the first aspect above, that a child is mounted on a thing such as a child seat is also discerned. Therefore, when a child is mounted on a child seat and is left, notification is appropriately performed. Thus, safety can be more enhanced.

A third aspect of the present invention relates to a vehicle control system. The vehicle control system according to the present aspect includes the mounted object detection device according to the first aspect above, and a vehicle controller configured to perform a predetermined control with respect to a vehicle. The load sensor is installed in a seat of the vehicle, and the vehicle controller identifies a seat in which a person or an animal is on a thing, on the basis of a detection result by the mounted object detection device, and stops operation of an airbag for the identified seat.

According to the vehicle control system of the present aspect, for example, when a child is mounted on a child seat, operation of an airbag for the seat on which the child seat is installed is stopped. Therefore, safety for the child can be enhanced.

BRIEF DESCRIPTION OF THE DRAWINGS

FIG. 5A schematically shows a state where the load sensors are installed at seating faces of seats of a vehicle, according to the embodiment;

FIG. 5B schematically shows a state where mounted objects are mounted on seating faces of seats of a vehicle, according to the embodiment;

FIG. 11A is a table showing a set warning number, a predetermined time, and a notification content according to the embodiment;

FIG. 11B is a table showing a set warning number, a predetermined time, and a notification content according to a modification;

FIG. 12A is a flow chart showing a process performed by the controller of the mounted object detection device, according to modification 1;

FIG. 12B is a flow chart showing a process performed by the controller of the mounted object detection device, according to modification 2;

FIG. 13A is a flow chart showing a process performed by the controller of the mounted object detection device, according to modification 3;

FIG. 13B is a flow chart showing a process performed by the controller of the mounted object detection device, according to modification 4;

Figure 1A:
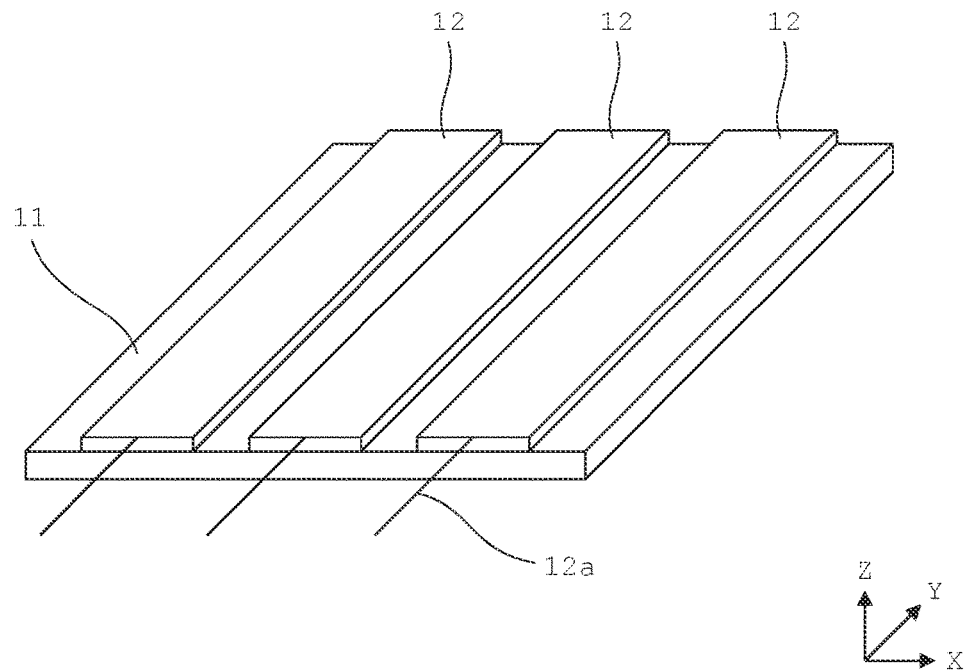
FIG. 1A is a perspective view schematically showing a base member and an electrically-conductive elastic body according to an embodiment.

It is noted that the drawings are solely for description and do not limit the scope of the present invention in any way.

DESCRIPTION OF PREFERRED EMBODIMENTS

A load sensor according to an embodiment below is a load sensor in which a plurality of sensor parts (element parts) each for detecting a load are disposed in a matrix shape. Such a load sensor may be referred to as a "capacitance-type pressure-sensitive sensor element", a "capacitive pressure detection sensor element", a "pressure-sensitive switch element", or the like. A mounted object detection device in the embodiment below is a device that is installed in a vehicle, that includes a load sensor as described above, and that determines a mounted object in a seat in the vehicle on the basis of an output from the load sensor. Examples of the mounted object include a person, an animal (e.g., dog), a child seat (infant auxiliary device), and an animal carrier bag. In the embodiment below, a configuration example in which the mounted object is a person and a child seat is shown. A vehicle control system in the embodiment below is a system that is installed in a vehicle, that includes the mounted object detection device as described above, and that performs a predetermined control with respect to the vehicle. The embodiment below is one embodiment of the present invention, and the present invention is not limited by the embodiment below in any way.

Hereinafter, an embodiment of the present invention will be described with reference to the drawings. For convenience, X-, Y-, and Z-axes orthogonal to each other are provided in the drawings. The Z-axis direction is the height direction of a load sensor 1.

The load sensor 1 is described with reference to FIG. 1A to FIG. 4.

FIG. 1A is a perspective view schematically showing a base member 11 and three electrically-conductive elastic bodies 12 set on the upper face of the base member 11.

The base member 11 is an insulative member having elasticity, and has a flat plate shape parallel to an X-Y plane. The base member 11 is formed from a non-electrically-conductive resin material or a non-electrically-conductive rubber material. The resin material used in the base member 11 is a resin material of at least one type selected from the group consisting of a styrene-based resin, a silicone-based resin (e.g., polydimethylpolysiloxane (PDMS)), an acrylic resin, a rotaxane-based resin, a urethane-based resin, and the like, for example. The rubber material used in the base member 11 is a rubber material of at least one type selected from the group consisting of silicone rubber, isoprene rubber, butadiene rubber, styrene-butadiene rubber, chloroprene rubber, nitrile rubber, polyisobutylene, ethylene-propylene rubber, chlorosulfonated polyethylene, acrylic rubber, fluororubber, epichlorohydrin rubber, urethane rubber, natural rubber, and the like, for example.

The electrically-conductive elastic bodies 12 are set on the upper face (the face on the Z-axis positive side) of the base member 11 with an adhesive or the like. In FIG. 1A, three electrically-conductive elastic bodies 12 are set on the upper face of the base member 11. Each electrically-conductive elastic body 12 is an electrically-conductive member having elasticity. The electrically-conductive elastic bodies 12 each have a band-like shape that is long in the Y-axis direction on the upper face of the base member 11, and are set so as to be arranged in a state of being separated from each other in the X-axis direction. At an end portion on the Y-axis negative side of each electrically-conductive elastic body 12, a cable 12a electrically connected to the electrically-conductive elastic body 12 is set. Each electrically-conductive elastic body 12 is formed from a resin material and an electrically-conductive filler dispersed therein, or from a rubber material and an electrically-conductive filler dispersed therein.

Similar to the resin material used in the base member 11 described above, the resin material used in the electrically-conductive elastic body 12 is a resin material of at least one type selected from the group consisting of a styrene-based resin, a silicone-based resin (polydimethylpolysiloxane (e.g., PDMS)), an acrylic resin, a rotaxane-based resin, a urethane-based resin, and the like, for example. Similar to the rubber material used in the base member 11 described above, the rubber material used in the electrically-conductive elastic body 12 is a rubber material of at least one type selected from the group consisting of silicone rubber, isoprene rubber, butadiene rubber, styrene-butadiene rubber, chloroprene rubber, nitrile rubber, polyisobutylene, ethylene-propylene rubber, chlorosulfonated polyethylene, acrylic rubber, fluororubber, epichlorohydrin rubber, urethane rubber, natural rubber, and the like, for example.

The electrically-conductive filler used in the electrically-conductive elastic body 12 is a material of at least one type selected from the group consisting of: metal materials such as Au (gold), Ag (silver), Cu (copper), C (carbon), ZnO (zinc oxide), $In_2O_3$ (indium oxide (III)), and $SnO_2$ (tin oxide (IV)); electrically-conductive macromolecule materials such as PEDOT:PSS (i.e., a complex composed of poly(3,4-ethylenedioxythiophene) (PEDOT) and polystyrene sulfonate (PSS)); electrically-conductive fibers such as a metal-coated organic matter fiber and a metal wire (fiber state); and the like, for example.

Figure 1B:
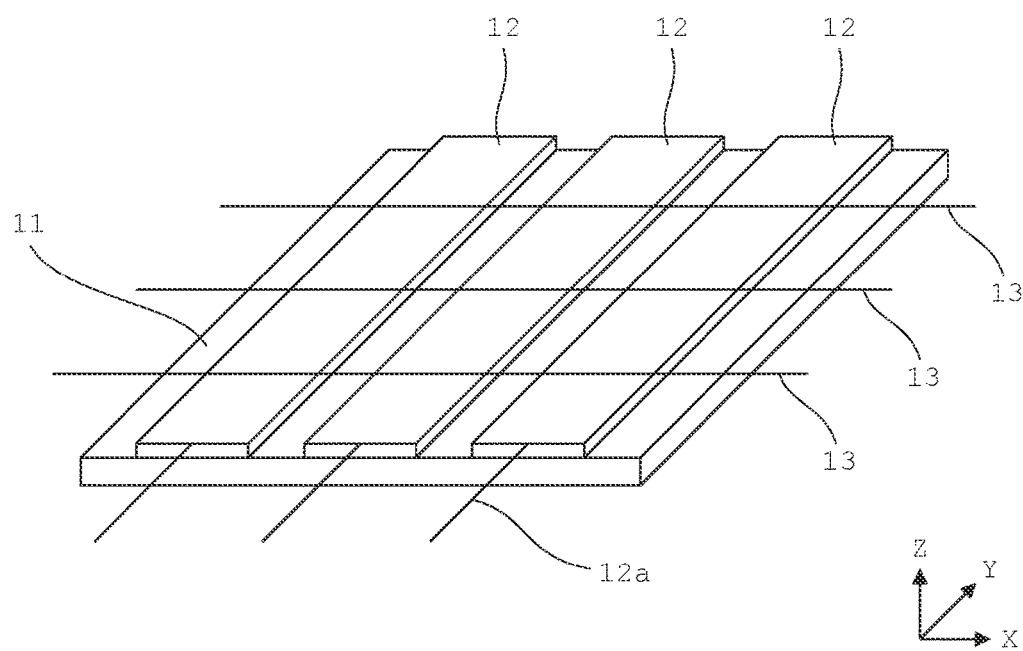
FIG. 1B is a perspective view schematically showing covered copper wires according to the embodiment.

FIG. 1B is a perspective view schematically showing three covered copper wires 13 placed on a structure in FIG. 1A.

Each covered copper wire 13 is disposed so as to be superposed on the upper face of the three electrically-conductive elastic bodies 12 shown in FIG. 1A. Here, three covered copper wires 13 are disposed so as to be superposed on the upper face of three electrically-conductive elastic bodies 12. Each covered copper wire 13 is composed of an electrically-conductive wire member and a dielectric body that covers the surface of the wire member. The three covered copper wires 13 are disposed so as to be arranged along the longitudinal direction (the Y-axis direction) of the electrically-conductive elastic bodies 12, so as to cross the electrically-conductive elastic bodies 12. Each covered copper wire 13 is disposed, extending in the X-axis direction, so as to extend across the three electrically-conductive elastic bodies 12. The configuration of the covered copper wire 13 will be described later with reference to FIG. 3A and FIG. 3B.

Figure 2A:
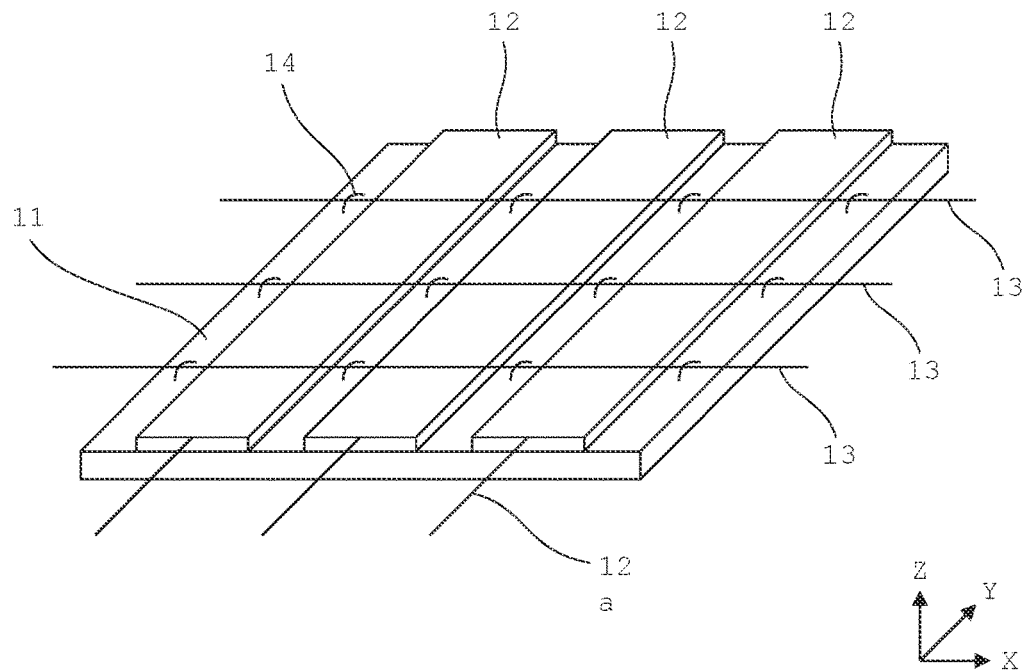
FIG. 2A is a perspective view schematically showing threads according to the embodiment.

FIG. 2A is a perspective view schematically showing threads 14 set on the structure shown in FIG. 1B.

After the three covered copper wires 13 have been disposed as in FIG. 1B, each covered copper wire 13 is connected to the base member 11 by threads 14 so as to be movable in the longitudinal direction (the X-axis direction) of the covered copper wire 13. In the example shown in FIG. 2A, 12 threads 14 connect the covered copper wires 13 to the base member 11 at positions other than the positions where the electrically-conductive elastic bodies 12 and the covered copper wires 13 overlap each other. Each thread 14 is formed from an electrically-conductive material, and is composed of a fiber and an electrically-conductive metal material dispersed therein, for example. The electrically-conductive metal material used in the thread 14 is silver, for example.

Figure 2B:
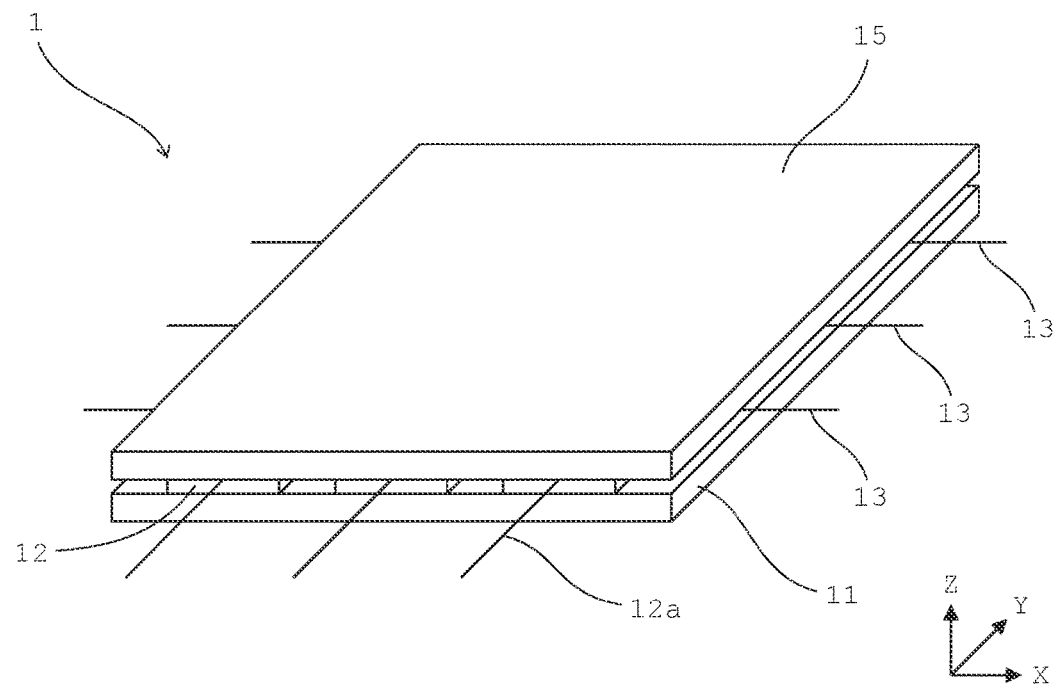
FIG. 2B is a perspective view schematically showing a load sensor of which assembling has been completed as a result of a base member having been set, according to the embodiment.

FIG. 2B is a perspective view schematically showing a base member 15 set to the structure in FIG. 1B.

From above the structure shown in FIG. 2A, the base member 15 is set as shown in FIG. 2B. The base member 15 is an insulative member. The base member 15 is a resin material of at least one type selected from the group consisting of polyethylene terephthalate, polycarbonate, polyimide, and the like, for example. The base member 15 has a flat plate shape parallel to the X-Y plane, and the size of the base member 15 in the X-Y plane is similar to that of the base member 11. The vertexes at the four corners of the base member 15 are connected to the vertexes at the four corners of the base member 11 by a silicone rubber-based adhesive, a thread, or the like, whereby the base member 15 is fixed to the base member 11. Accordingly, the load sensor 1 is completed as shown in FIG. 2B.

Figure 3A:
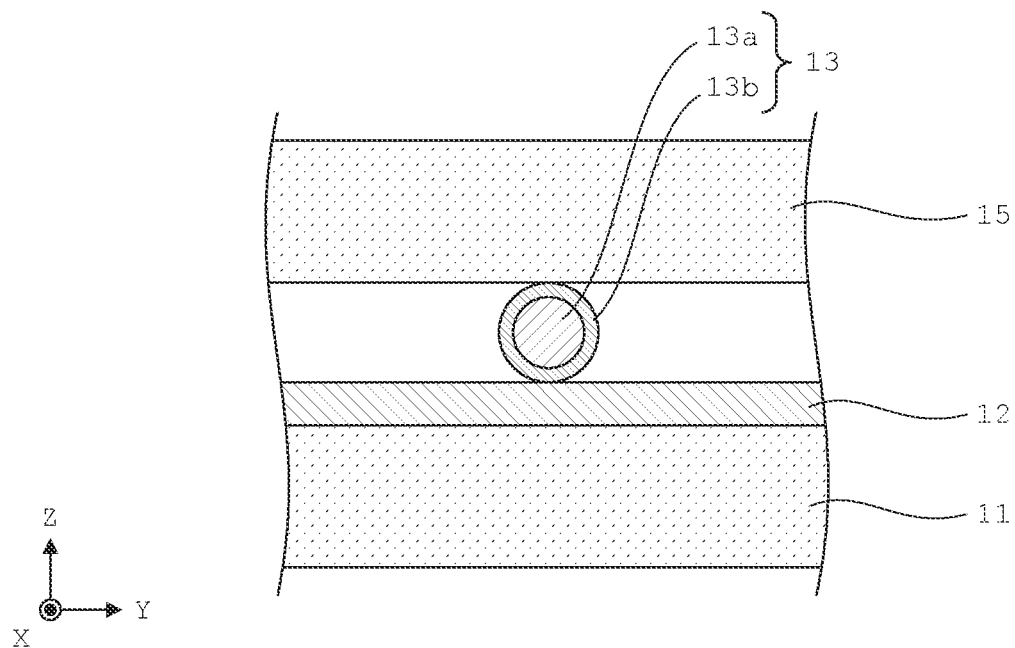
FIG. 3A and FIG. 3B are each a cross-sectional view schematically showing the periphery of a covered copper wire when viewed in an X-axis negative direction, according to the embodiment.
Figure 3B:
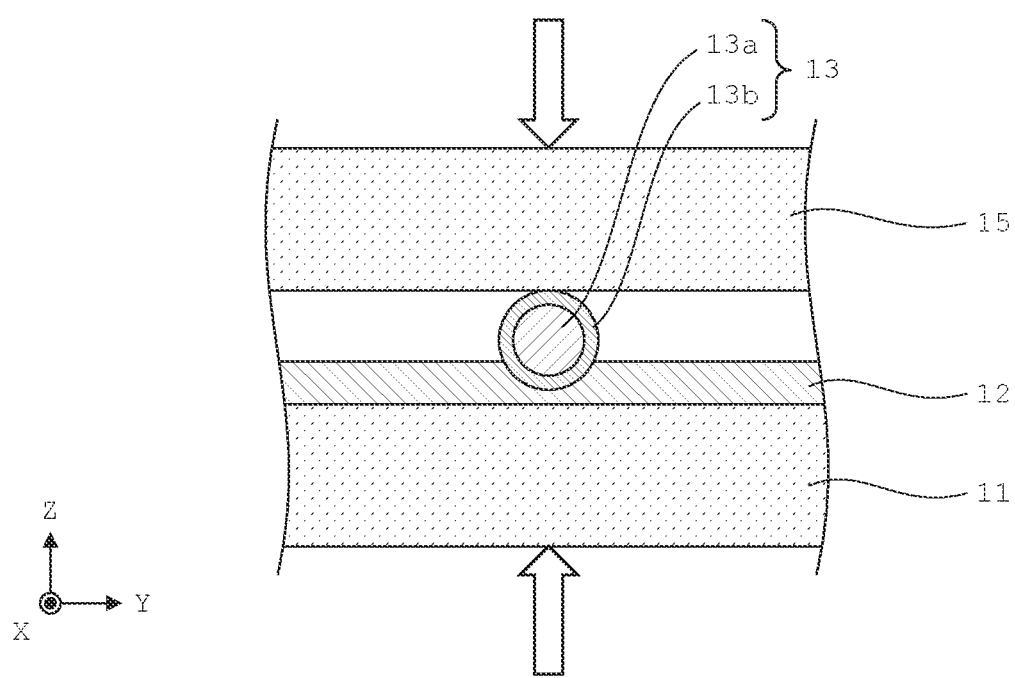

FIG. 3A and FIG. 3B are each a cross-sectional view schematically showing the periphery of a covered copper wire 13 when viewed in the X-axis negative direction. FIG. 3A shows a state where no load is applied, and FIG. 3B shows a state where loads are applied.

As shown in FIG. 3A, each covered copper wire 13 is composed of a copper wire 13a and a dielectric body 13b covering the copper wire 13a. The copper wire 13a is formed of copper, and the diameter of the copper wire 13a is about 60 μm, for example. The dielectric body 13b has an electric insulation property, and is formed from a resin material, a ceramic material, a metal oxide material, or the like, for example. The dielectric body 13b may be a resin material of at least one type selected from the group consisting of a polypropylene resin, a polyester resin (e.g., polyethylene terephthalate resin), a polyimide resin, a polyphenylene sulfide resin, a polyvinyl formal resin, a polyurethane resin, a polyamide imide resin, a polyamide resin, and the like, or may be a metal oxide material of at least one type selected from the group consisting of $Al_2O_3$, $Ta_2O_5$, and the like.

When no load is applied to the region shown in FIG. 3A, the force applied between the electrically-conductive elastic body 12 and the covered copper wire 13, and the force applied between the base member 15 and the covered copper wire 13 are substantially zero. From this state, when a load is applied in the upward direction from the lower face of the base member 11 and a load is applied in the downward direction to the upper face of the base member 15, the electrically-conductive elastic body 12 is deformed by the covered copper wire 13, as shown in FIG. 3B. It should be noted that, when the lower face of the base member 11 or the upper face of the base member 15 is placed on a stationary object and a load is applied only to the other base member as well, a load will be similarly received from the stationary object side due to reaction.

As shown in FIG. 3B, when loads are applied, the covered copper wire 13 is brought close to the electrically-conductive elastic body 12 so as to be wrapped by the electrically-conductive elastic body 12, and the contact area between the covered copper wire 13 and the electrically-conductive elastic body 12 increases. Accordingly, the capacitance between the copper wire 13a in the covered copper wire 13 and the electrically-conductive elastic body 12 changes, the capacitance in this region is detected, and the load applied to this region is calculated.

Figure 4:
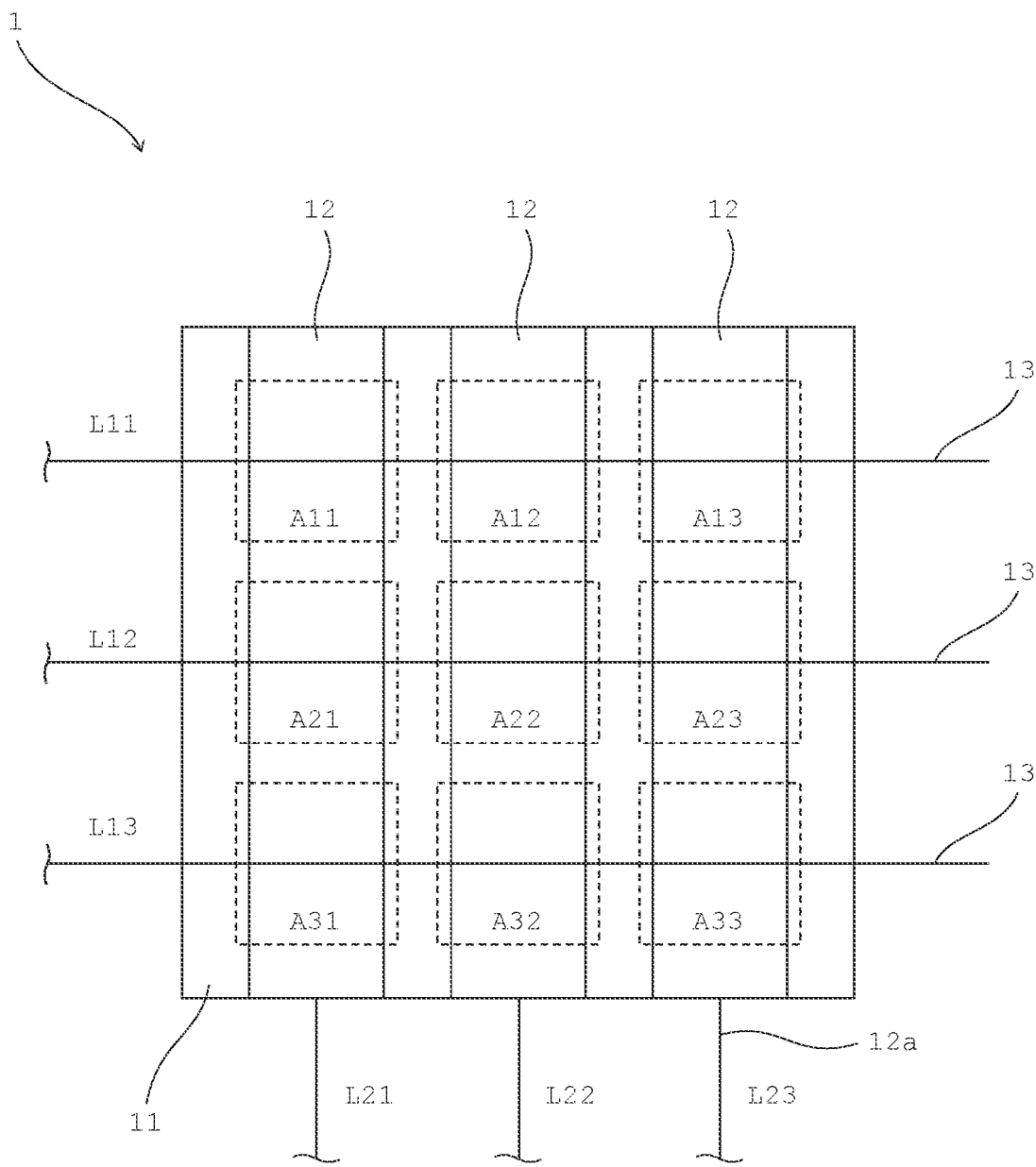
FIG. 4 is a plan view schematically showing the load sensor when viewed in a Z-axis negative direction, according to the embodiment.

FIG. 4 is a plan view schematically showing the load sensor 1 when viewed in the Z-axis negative direction. For convenience, the threads 14 and the base member 15 are not shown in FIG. 4.

As shown in FIG. 4, sensor parts A11, A12, A13, A21, A22, A23, A31, A32, A33 in which capacitance changes in accordance with a load are formed at positions where the three electrically-conductive elastic bodies 12 and the three covered copper wires 13 cross each other. Each sensor part includes an electrically-conductive elastic body 12 and a covered copper wire 13, the electrically-conductive elastic body 12 forms one pole (e.g., negative pole) for capacitance, and the covered copper wire 13 forms the other pole (e.g., positive pole) for capacitance.

When a load is applied in the Z-axis direction to each sensor part, the covered copper wire 13 is wrapped by the electrically-conductive elastic body 12 due to the load. Accordingly, the contact area between the covered copper wire 13 and the electrically-conductive elastic body 12 changes, and the capacitance between the covered copper wire 13 and the electrically-conductive elastic body 12 changes. An end portion on the X-axis negative side of each covered copper wire 13 and an end portion on the Y-axis negative side of each cable 12a are connected via a circuit to a controller 201 described later with reference to FIG. 7.

As shown in FIG. 4, the three covered copper wires 13 are referred to as lines L11, L12, L13, and the cables 12a drawn from the three electrically-conductive elastic bodies 12 are referred to as lines L21, L22, L23. The positions where the line L11 crosses the electrically-conductive elastic bodies 12 connected to the lines L21, L22, L23 are the sensor parts A11, A12, A13, respectively. The positions where the line L12 crosses the electrically-conductive elastic bodies 12 connected to the lines L21, L22, L23 are the sensor parts A21, A22, A23, respectively. The positions where the line L13 crosses the electrically-conductive elastic bodies 12 connected to the lines L21, L22, L23 are the sensor parts A31, A32, A33, respectively.

When a load is applied to the sensor part A11, the contact area between the electrically-conductive elastic body 12 and the covered copper wire 13 increases in the sensor part A11. Therefore, when the capacitance between the line L11 and the line L21 is detected, the load applied to the sensor part A11 can be calculated. Similarly, in another sensor part as well, when the capacitance between the two lines crossing each other in the other sensor part is detected, the load applied to the other sensor part can be calculated.

Here, in the present embodiment, the load sensor 1 is installed in a seat of a vehicle, and on the basis of an output from the load sensor 1, a mounted object (a person, a child seat, or the like) on the seat in the vehicle is determined. In the following, with reference to FIG. 5A to FIG. 6F, the outline of a process of determining a mounted object on the basis of an output of the load sensor 1 installed in a vehicle is described.

FIG. 5A schematically shows a state where the load sensors 1 are installed at seating faces of seats of a vehicle C.

In the present embodiment, the number of seats provided in the vehicle C is four, and four seats St(1) to St(4) are provided in the vehicle C. The seat St(1) is a driver's seat, the seat St(2) is a passenger seat, the seat St(3) is a seat positioned behind the driver's seat, and the seat St(4) is a seat positioned diagonally behind the driver's seat. The load sensor 1 is installed at the seating face of each seat, and each load sensor 1 is connected to the controller 201 (see FIG. 7) installed in the vehicle C. The load sensor 1 detects loads in a detection region 1a in which sensor parts are disposed in a matrix shape.

A mounted object detection device 2 (see FIG. 7) including a plurality of load sensors 1 provided in the vehicle C stores, when each load sensor 1 has been incorporated in a seat, a detection value of each sensor part of the load sensor 1, as a reference value, in a state where no mounted object is present and under initial settings set by an operator. Accordingly, even when an initial load is caused because a cover or the like of the seat is installed on the load sensor 1, a reference value corresponding to the initial load is stored. Therefore, when the initial load is subtracted from the load detected at the time of actual operation, a load distribution can be detected in a state where the initial load is excluded.

FIG. 5B schematically shows a state where mounted objects are mounted on seating faces of seats of the vehicle C.

In the example shown in FIG. 5B, a person (driver) is sitting on the seat St(1), and a person is also sitting on the seat St(3). Meanwhile, a child seat is installed on each of the seat St(2) and the seat St(4), and a child is sitting on the child seat in the seat St(4). As shown in FIG. 5B, the load sensor 1 installed at the seating face of each seat detects a load distribution in accordance with a mounted object mounted on the detection region 1a.

FIG. 6A to FIG. 6F each show a load distribution actually detected by the load sensor 1 installed at a seating face.

The load sensor 1 in this case includes sensor parts arranged in a matrix shape composed of 32 sensor parts in the vertical direction and 32 sensor parts in the horizontal direction. In FIG. 6A to FIG. 6F, a rectangular region corresponding to each sensor part is provided with a color in accordance with a load value detected by the sensor part. In accordance with increase in the magnitude of the load, the color provided to the rectangular region changes in the order of blue, green, yellow, and red. The rectangular regions in FIG. 6A to FIG. 6F originally had colors, but are now shown in gray scale for convenience. Each load value shown in FIG. 6A to FIG. 6F has been obtained by subtracting an initial load from an actually detected load.

Figure 6A:
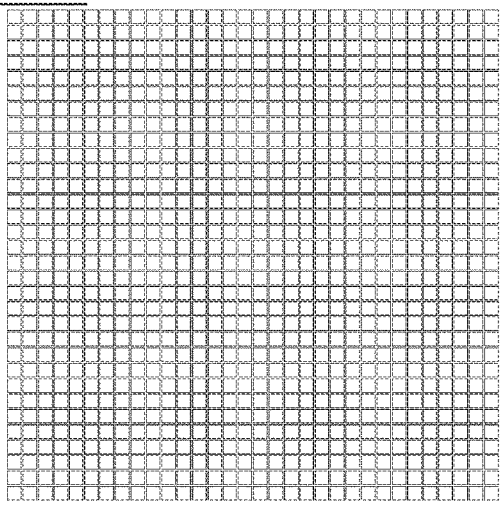
FIG. 6A to FIG. 6F each show a load distribution actually detected by the load sensor installed at a seating face, according to the embodiment.
Figure 6B:
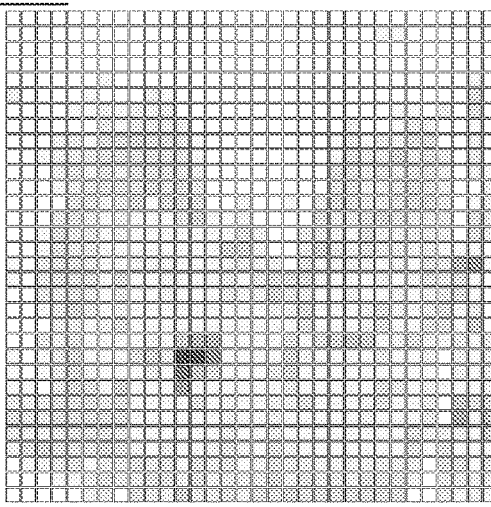
Figure 6C:
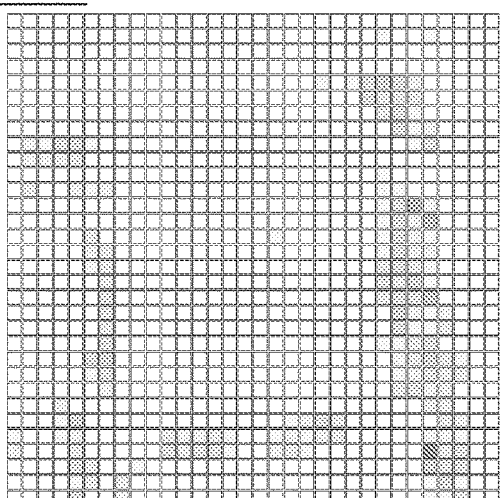
Figure 6D:
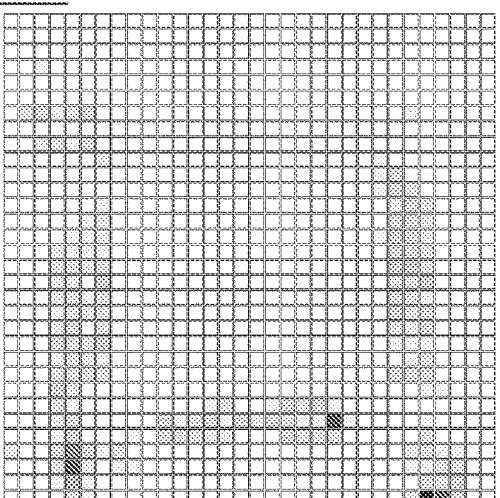

When no mounted object is present on the load sensor 1, no load is applied to any of the sensor parts as shown in FIG. 6A. When a person is directly sitting on the load sensor 1, the range to which loads are applied has a shape of buttocks of the person, as shown in FIG. 6B. When only a child seat is installed on the load sensor 1, loads are applied in accordance with the shapes of the legs of the child seat, as shown in FIG. 6C. When a child is sitting on a child seat installed on the load sensor 1, loads are applied in accordance with the shapes of the legs of the child seat and the loads are slightly greater than those in FIG. 6C, as shown in FIG. 6D.

Here, whether or not a mounted object is present can be discerned on the basis of whether or not loads are applied to the load sensor 1. In addition, a case where a person is directly sitting and a case where a child seat has been installed can be discerned from each other on the basis of the shapes (load distributions) of the ranges in which loads are applied. However, with respect to a case where only a child seat has been installed and a case where a child is sitting on a child seat, the weight of the child seat and the body weight of the child are not constant, and in addition, the shape of buttocks of a person does not appear unlike the case of FIG. 6B. Therefore, it is difficult to discern these cases on the basis of the load distributions detected by the load sensor 1.

Therefore, the inventors focused on temporal change in the load distribution in order to discern the case where only a child seat has been installed and a case where a person (child) is sitting on a child seat. Specifically, the inventors focused on the following: when a person is present on a child seat, the load distribution varies in accordance with a lapse of time in association with movement of the person, whereas when no person is present, the load distribution does not vary in accordance with a lapse of time.

Figure 6E:
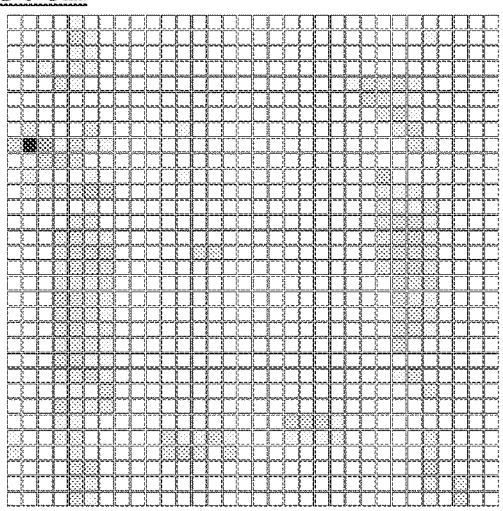
Figure 6F:
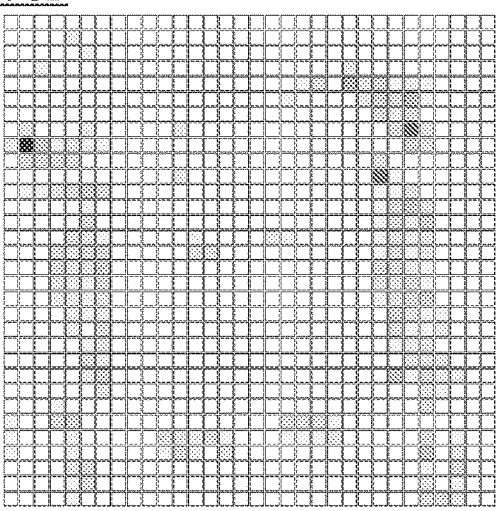

FIG. 6E and FIG. 6F each show load distributions measured at timings different from each other when a child was sitting on a child seat installed on a seat.

When a child is sitting on a child seat, the load distribution varies on the child seat with a lapse of time, as shown in FIG. 6E and FIG. 6F. In the case of FIG. 6E, since the child is close to the left side on the child seat, the loads on the left side are large in the range where the loads of the child seat are applied. Meanwhile, in the case of FIG. 6F, since the child is close to the right side on the child seat, the loads on the right side are large in the range where the loads of the child seat are applied.

Therefore, as shown in FIG. 6E and FIG. 6F, whether or not a child is sitting on a child seat can be determined on the basis of whether or not the load distribution varies in accordance with temporal change. A process of detecting a mounted object on a seat will be described later with reference to FIG. 8.

Figure 7:
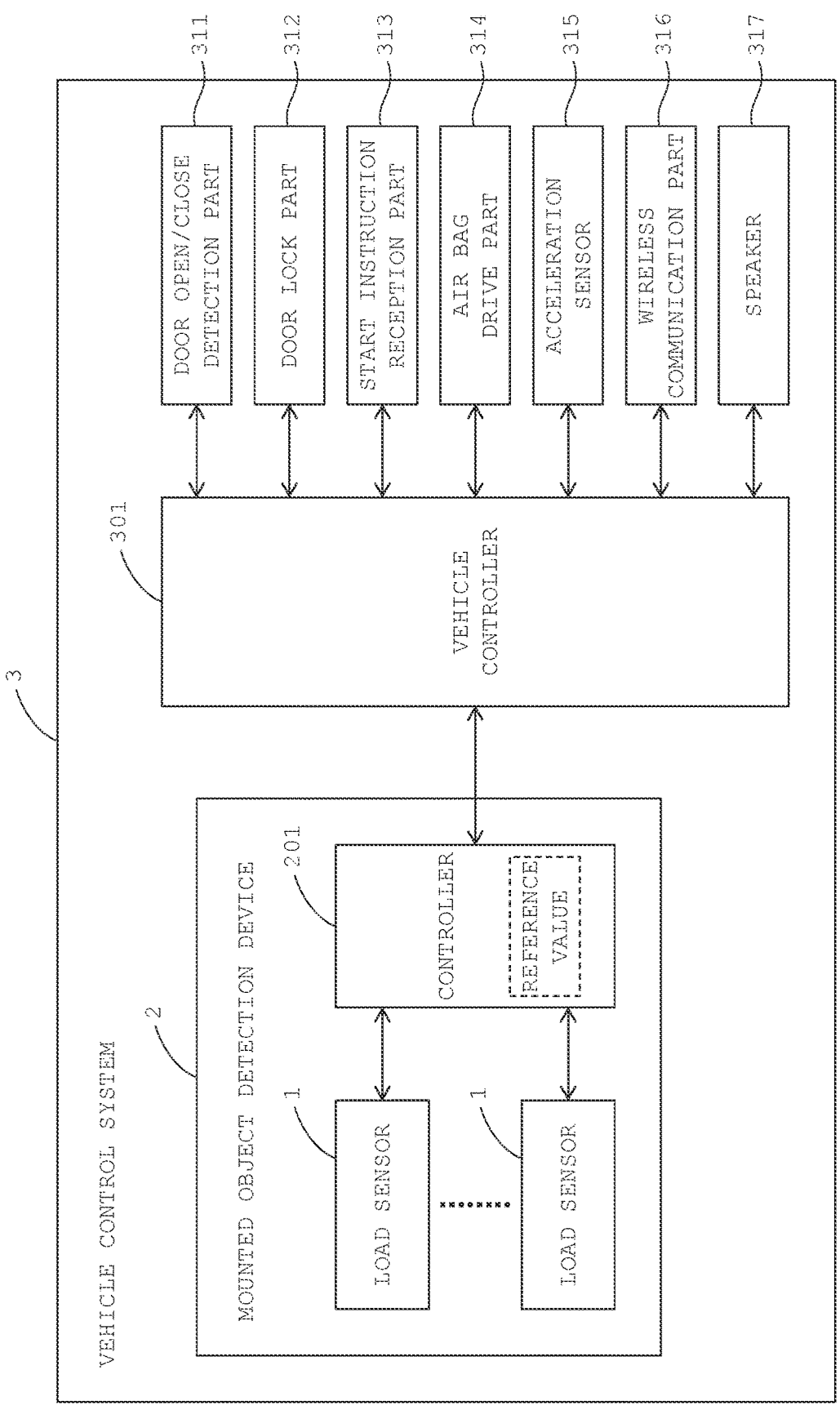
FIG. 7 is a block diagram showing configurations of a mounted object detection device and a vehicle control system according to the embodiment.

FIG. 7 is a block diagram showing configurations of the mounted object detection device 2 and a vehicle control system 3.

The mounted object detection device 2 is installed in the vehicle C, and includes at least one load sensor 1 and the controller 201. The mounted object detection device 2 of the present embodiment includes four load sensors 1 respectively installed in the four seats of the vehicle C, as shown in FIG. 5A and FIG. 5B. Each load sensor 1 is connected to the controller 201.

The controller 201 includes an arithmetic processing circuit and a memory, and is implemented by an FPGA or an MPU, for example. The memory of the controller 201 has stored therein the reference value of each sensor part of each load sensor 1 described above. The controller 201 detects the load distribution on the detection region 1a (see FIG. 5A and FIG. 5B) of the load sensor 1 on the basis of an output from the load sensor 1. Specifically, the controller 201 applies a rectangular voltage to a sensor part as a measurement target to measure a voltage value, and calculates the capacitance of the measurement target sensor part on the basis of the measured voltage value, to calculate the load applied to the sensor part. The controller 201 performs such load calculation for each sensor part, to obtain the load distribution on the detection region 1a. Then, on the basis of the obtained load distribution, the controller 201 detects the situation of the mounted object on the load sensor 1.

The vehicle control system 3 includes the mounted object detection device 2, a vehicle controller 301, a door open/close detection part 311, a door lock part 312, a start instruction reception part 313, an air bag drive part 314, an acceleration sensor 315, a wireless communication part 316, and a speaker 317. Each component of the vehicle control system 3 excluding the mounted object detection device 2 has been installed in the vehicle C in advance.

The vehicle controller 301 includes an arithmetic processing circuit and a memory, and is implemented by an FPGA or an MPU, for example. The vehicle controller 301 controls the door open/close detection part 311, the door lock part 312, the start instruction reception part 313, the air bag drive part 314, the acceleration sensor 315, the wireless communication part 316, and the speaker 317, and receives signals detected by these components.

The door open/close detection part 311 detects open/close of each door of the vehicle C. The door lock part 312 locks the door of the vehicle C so as not to open. The start instruction reception part 313 receives an instruction of turning on and off of the engine from a user. The start instruction reception part 313 may be implemented by a reception mechanism for an ignition key, or may be implemented by an engine-on button. The air bag drive part 314 drives an air bag when an impact has occurred. The air bag is installed at all of the four seats. The acceleration sensor 315 measures acceleration of the vehicle C. The wireless communication part 316 performs wireless communication via a public wireless line. The speaker 317 outputs sound to the outside of the vehicle C. The speaker 317 is a speaker for sounding a horn (klaxon), for example. The speaker 317 is not limited to a speaker for sounding a horn (klaxon).

Figure 8:
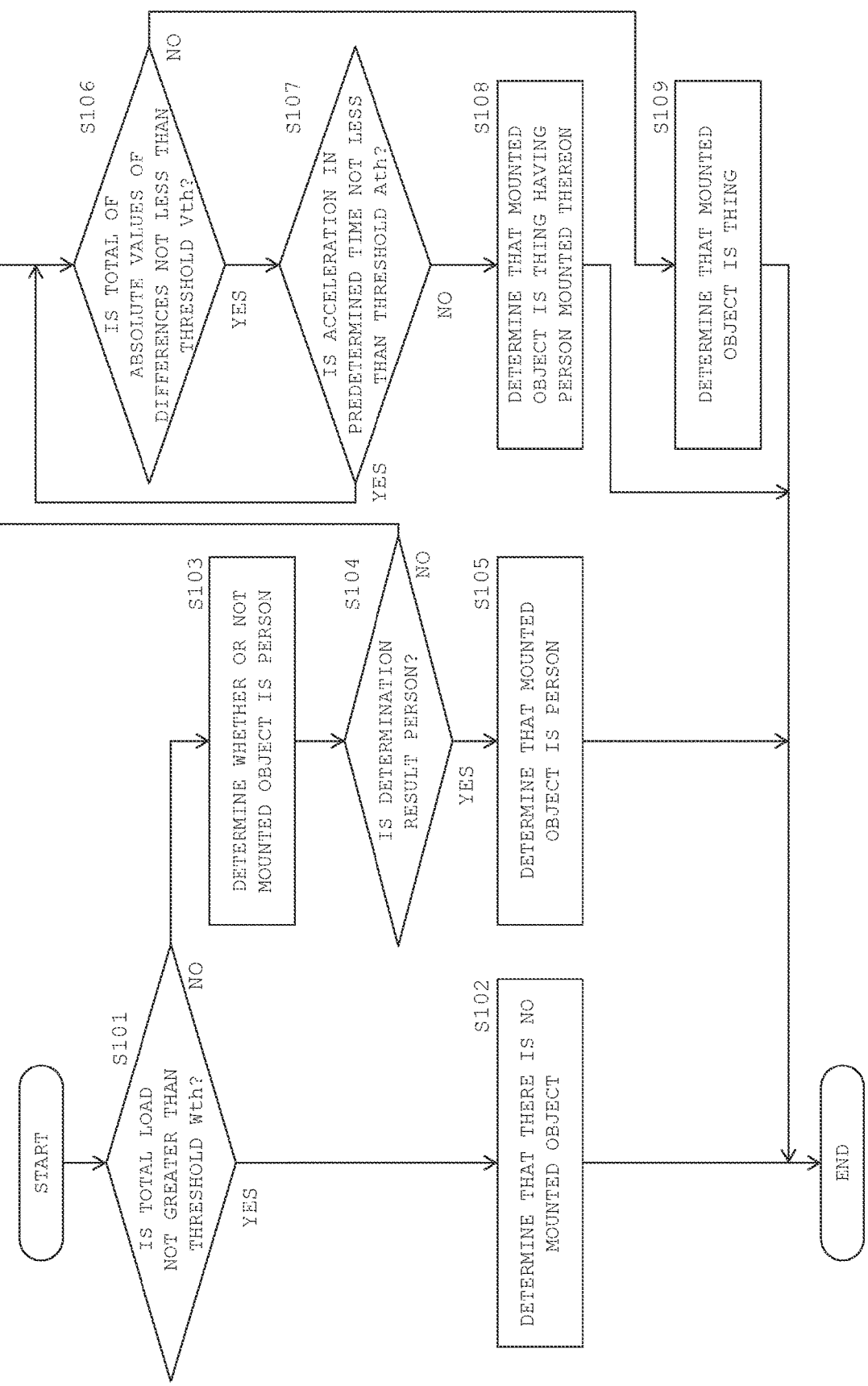
FIG. 8 is a flow chart showing a process performed by a controller of the mounted object detection device.

FIG. 8 is a flow chart showing a process performed by the controller 201 of the mounted object detection device 2.

The mounted object detection device 2 repeatedly performs a process shown in FIG. 8 at a predetermined time interval (e.g., 1/40 seconds) for the load sensor 1 of each seat, while using a battery of the vehicle C as a power supply. In a second process performed by the vehicle controller 301 described later, it is necessary to obtain the state of each seat in a state where the engine of the vehicle C is off. Therefore, the mounted object detection device 2 performs the process in FIG. 8 on the background even when the engine of the vehicle C is off. It should be noted that the mounted object detection device 2 may perform the process in FIG. 8 with respect to a target load sensor 1, when having received an inquiry from the vehicle controller 301.

The load used in the process below is obtained by subtracting the above-described initial load from a load calculated on the basis of an output from each sensor part.

Upon start of the process, the controller 201 determines whether or not the total (total load) of loads detected by the respective sensor parts of the load sensor 1 is not greater than a threshold Wth (S101). As shown in FIG. 6A, when no mounted object is present on the load sensor 1, the total load is substantially zero. When a mounted object is present on the load sensor 1, the total load has a value of a certain magnitude, as shown in FIG. 6B to FIG. 6F. Therefore, when the threshold Wth is set so as to be able to discern a case where a mounted object is present and a case where no mounted object is present, the presence/absence of a mounted object can be determined.

When the total load is not greater than the threshold Wth (S101: YES), the controller 201 determines that there is no mounted object on the detection region 1a of the load sensor 1 (S102). On the other hand, when the total load is greater than the threshold Wth (S101: NO), the controller 201 determines whether or not the mounted object is a person, on the basis of the shape of the load distribution detected by the load sensor 1 (3103).

In the determination in S103, a conventional well-known method can be used. For example, the controller 201 may have been previously caused to learn, through AI (artificial intelligence), a load distribution of a case where the mounted object is a person, and may determine whether or not the mounted object is a person, on the basis of a determination-target load distribution. Alternatively, the controller 201 may calculate, using a predetermined discernment formula, a matching degree between a typical load distribution of a case where the mounted object is a person and a determination-target load distribution, and may determine whether or not the mounted object is a person, on the basis of the calculated matching degree.

When the determination result in S103 is a person (S104: YES), the controller 201 determines that the mounted object on the detection region 1a of the load sensor 1 is a person (S105). As a result, it is recognized that only a person is sitting on the detection region 1a, as in the seats St(1), St(3) in FIG. 5B. On the other hand, when the determination result in S103 is not a person (S104: NO), the controller 201 determines that the mounted object on the detection region 1a of the load sensor 1 is a thing (child seat) only or a thing (child seat) having a person (child) mounted thereon, and advances the process to S106.

Subsequently, the controller 201 determines whether or not temporal change in the load distribution detected by the load sensor 1 is not less than a threshold Vth (S106). When YES has been determined in 3106, the controller 201 determines whether or not acceleration in a predetermined time is not less than a threshold Ath (S107).

In the determination in S106, specifically, on the basis of the current load distribution and a load distribution of a predetermined time before (e.g., 1 second before), the controller 201 calculates the absolute value of the difference between load values in a sensor part at the same position, and totals the calculated absolute values of the differences of all of the sensor parts. Then, the controller 201 uses the total of the absolute values of the differences as the temporal change in the load distribution, and determines whether or not the temporal change in the load distribution is not less than the threshold Vth. For example, when the state in FIG. 6E has changed to the state in FIG. 6F, the total of the absolute values of the differences becomes a large value. For such a case, the threshold Vth is set so as to be able to discern whether or not a child has moved on the child seat. Accordingly, whether or not there is a child on the child seat can be discerned.

However, even in a case where the temporal change in the load distribution has been determined to be not less than the threshold Vth in S106 and it is estimated that there is a child on the child seat, if the vehicle C is moving with acceleration, there is a possibility that temporal change in the load distribution occurs even though there is no child on the child seat. That is, even when there is no child on the child seat, acceleration may cause the balance of the load distribution to be changed in the acceleration direction, and as a result, temporal change in the load distribution may become not less than the threshold Vth.

Therefore, in the present embodiment, in S107, whether or not acceleration of the vehicle C in a predetermined time (within 3 seconds) is not less than the threshold Ath (e.g., 1 m/s$^2$) is determined. The acceleration of the vehicle C is previously obtained by the acceleration sensor 315, and the controller 201 obtains the acceleration of the vehicle C via the vehicle controller 301. Accordingly, making a determination that there is a child on the child seat although there is no child on the child seat can be prevented.

When the temporal change in the load distribution is not less than the threshold Vth (S106: YES) and the acceleration in the predetermined time is less than the threshold Ath (S107: NO), the controller 201 determines that the mounted object on the detection region 1a of the load sensor 1 is a thing (child seat) having a person (child) mounted thereon (S108). On the other hand, when the acceleration has become not less than the threshold Ath in the predetermined time (S107: YES), the process is returned to S106, and determination in S106 is performed again. When the temporal change in the load distribution is less than the threshold Vth (S106: NO), the controller 201 determines that the mounted object on the detection region 1a of the load sensor 1 is a thing (child seat) having no person (child) mounted thereon (S109).

Figure 9:
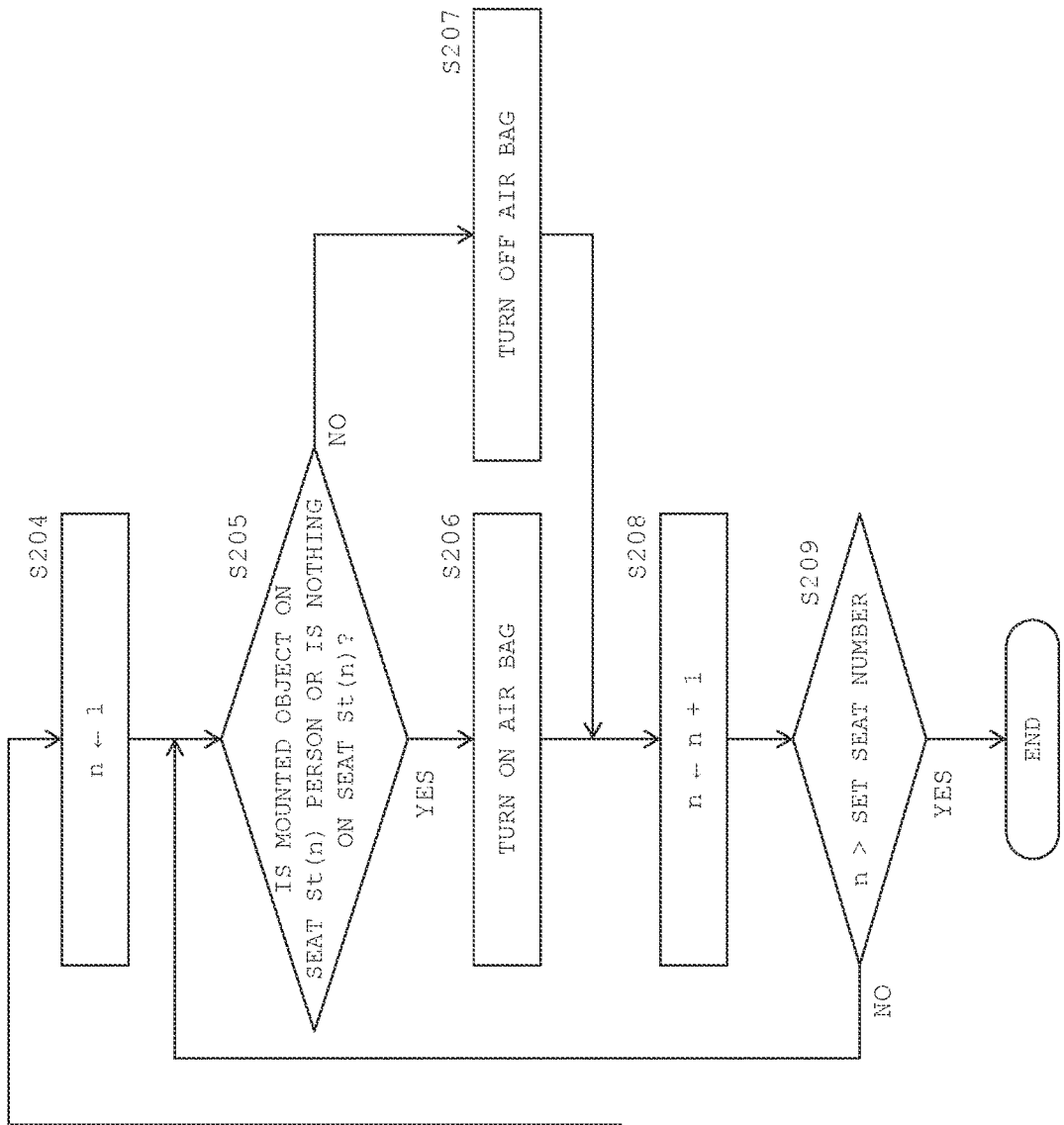
FIG. 9 is a flow chart showing a first process performed by a vehicle controller of the vehicle control system according to the embodiment.

FIG. 9 is a flow chart showing a first process performed by the vehicle controller 301 of the vehicle control system 3. The first process performed by the vehicle controller 301 is a process regarding a control of turning on/off an air bag.

When a start condition has been satisfied (S201: YES), the vehicle controller 301 starts the processes of S202 and thereafter. The start condition is that an instruction of turning on the engine from the user has been received by the start instruction reception part 313 and the engine is in an on-state, for example. The start condition in S201 is not limited to that the engine is in an on-state, and may be: that the door open/close detection part 311 has detected that a door of the vehicle C has been opened; that the door lock part 312 has unlocked a door of the vehicle C; that, through the process in FIG. 8, it has been determined that there is a person on the driver's seat; or the like. Alternatively, that two or more of these conditions have been satisfied may be used as the start condition.

When the start condition has been satisfied (S201: YES), the vehicle controller 301 drives the air bag drive part 314, thereby setting the air bags installed in all of the seats, to be on (S202). Accordingly, the air bags installed in all of the seats enter a standby state, and at occurrence of an impact, the air bags will be driven.

Subsequently, the vehicle controller 301 inquires of the controller 201 of the mounted object detection device 2 the states regarding mounted objects on all of the seats, and obtains the states regarding mounted objects on all of the seats from the controller 201 (S203). Specifically, in response to the inquiry in S203, the controller 201 of the mounted object detection device 2 transmits, to the vehicle controller 301, the states, regarding mounted objects on all of the seats, that have been obtained through the process in FIG. 8. Accordingly, from the controller 201, the vehicle controller 301 receives, for each seat, a determination result of "there is no mounted object", "the mounted object is a person", "the mounted object is a thing (child seat) having a person (child) mounted thereon", or "the mounted object is a thing (child seat)".

Subsequently, in S204 to S209, the vehicle controller 301 resets the state of the air bag for each seat.

Specifically, the vehicle controller 301 substitutes 1 to a variable n that indicates the place of a seat (S204). On the basis of the state of the seat St(n) obtained in S203, the vehicle controller 301 determines whether the mounted object on the seat St(n) is a person, or whether there is no mounted object on the seat St(n) (S205). When the mounted object on the seat St(n) is a person or there is no mounted object on the seat St(n) (S205: YES), the vehicle controller 301 sets the air bag on the seat St(n) to be on (S206). Accordingly, the air bag installed at the seat St(n) enters a standby state, and at occurrence of an impact, the air bag will be driven. On the other hand, when the mounted object on the seat St(n) is a thing having a person mounted thereon, or a thing only (S205: NO), the vehicle controller 301 sets the air bag at the seat St (n) to be off (S207). Accordingly, the air bag installed at the seat St(n) enters an inactive state, and even at occurrence of an impact, the air bag will not be driven.

The vehicle controller 301 adds 1 to the value of the variable n (S208), and determines whether or not the value of the variable n is greater than the set seat number (the number of seats provided to the vehicle C) (S209). In the present embodiment, as shown in FIG. 5A and FIG. 5B, the set seat number is 4. When the value of the variable n is not greater than the set seat number (S209: NO), the process is returned to S205, and the processes of S205 to S209 are performed again. When the value of the variable n is greater than the set seat number (S209: YES), the air bag resetting for all of the seats is ended. Thus, the process ends.

When the process has ended, the process is executed from S201 again, and when the start condition is satisfied (S201: YES), the processes of S202 and thereafter are performed again. Since the start condition of the present embodiment is that the engine is in an on-state, the process shown in FIG. 9 will be repeatedly performed as long as the engine is on.

Figure 10:
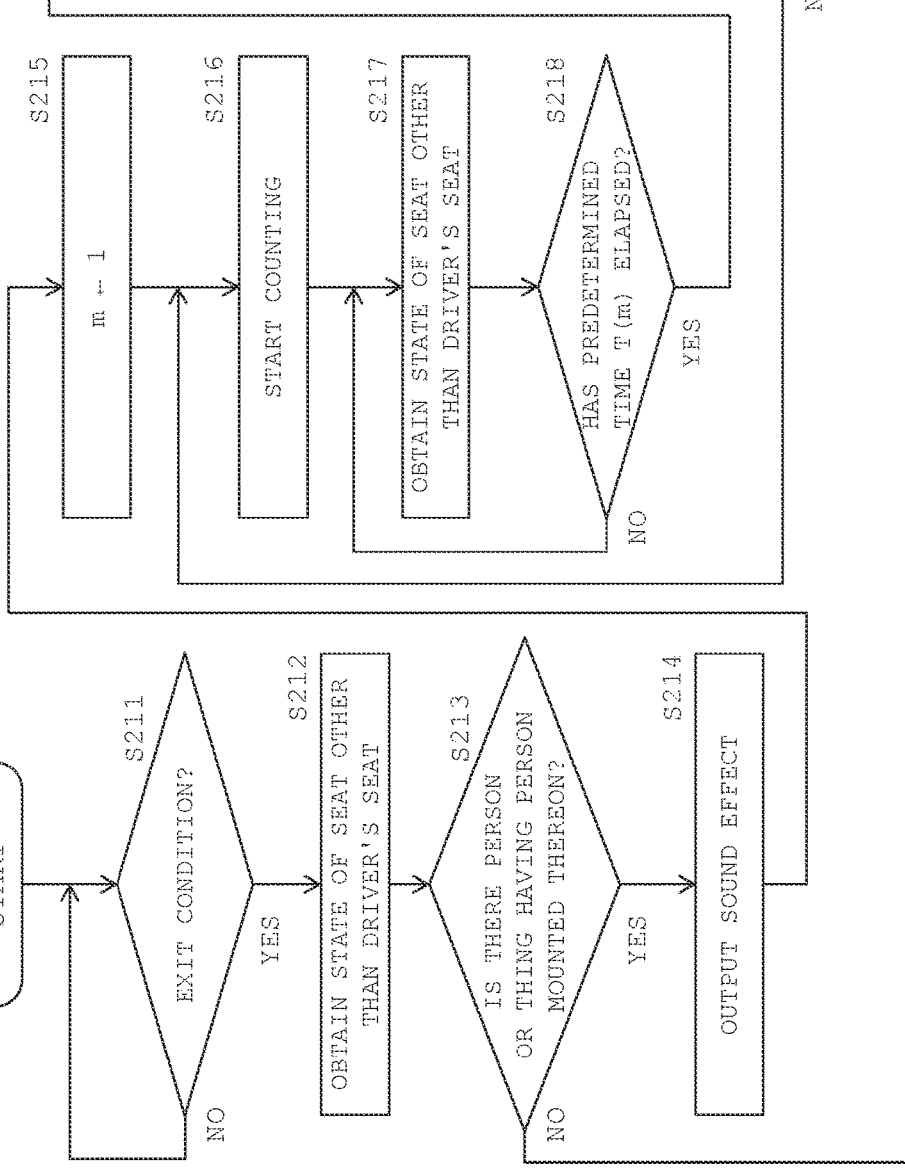
FIG. 10 is a flow chart showing a second process performed by the vehicle controller of the vehicle control system according to the embodiment.

FIG. 10 is a flow chart showing a second process performed by the vehicle controller 301 of the vehicle control system 3. The second process performed by the vehicle controller 301 is a process regarding a control of notifying that a person is left in the vehicle C.

When a predetermined exit condition regarding exit of the driver has been satisfied (S211: YES), the vehicle controller 301 starts the processes of S212 and thereafter. The exit condition in S211 is as follows, for example: the mounted object detection device 2 has obtained the state regarding the mounted object on the driver's seat through the process in FIG. 8, and the vehicle controller 301 has determined that there is no person on the driver's seat on the basis of the state, regarding the mounted object on the driver's seat, that has been obtained from the mounted object detection device 2.

The exit condition in S211 is not limited to that there is no person on the driver's seat, and may be another condition. For example, the exit condition may be: that an instruction of turning off the engine from the user has been received by the start instruction reception part 313, and the engine has entered an off-state; the door open/close detection part 311 has detected that a door of the vehicle C has been opened; that the door lock part 312 has unlocked a door of the vehicle C; that the vehicle C is in a stopped state; or the like. Alternatively, that two or more of these conditions have been satisfied may be used as the exit condition.

When the exit condition has been satisfied (S211: YES), the vehicle controller 301 inquires of the controller 201 of the mounted object detection device 2 the states regarding mounted objects on the seats other than the driver's seat, and obtains the states regarding mounted objects on the seats other than the driver's seat from the controller 201 (S212).

On the basis of the states regarding the mounted objects obtained in 3212, the vehicle controller 301 determines whether or not there is a person or a child seat (thing) having a person mounted thereon on a seat other than the driver's seat (S213). When there is no person or child seat having a person mounted thereon on any of the seats other than the driver's seat (S213: NO), it can be considered that there is no person in the vehicle C, and thus, the process ends. On the other hand, when there is a person or a child seat having a person mounted thereon on a seat other than the driver's seat (S213: YES), the vehicle controller 301 causes a sound effect of about 0.5 seconds long at a predetermined sound volume to be outputted once from the speaker 317 toward the outside of the vehicle C in order to make notification that there is a possibility that a person is left in the vehicle C (S214).

Subsequently, in S215 to S222, when a person is left in the vehicle C, the vehicle controller 301 makes a notification to this effect, at a predetermined time interval.

Specifically, the vehicle controller 301 substitutes 1 to a variable m indicating the number of times of warning (S215), and starts counting a timer (S216). Subsequently, similar to S212, the vehicle controller 301 obtains the states regarding mounted objects on the seats other than the driver's seat from the controller 201 of the mounted object detection device 2 (S217), and determines whether or not a predetermined time T(m) has elapsed (S218). As shown in FIG. 11A, the value of the predetermined time T(m) is different in accordance with the value of the variable m. For example, when the value of the variable m is 1, T(1) is 10 minutes, when the value of the variable m is 2, T(2) is 30 minutes, and when the value of the variable m is 3, T(3) is 1 hour.

With reference back to FIG. 10, when the predetermined time T(m) has not elapsed (S218: NO), the vehicle controller 301 returns the process to S217, and performs the process of S217 again, to obtain information regarding mounted objects of the seats other than the driver's seat.

When the predetermined time T(m) has elapsed (S218: YES), the vehicle controller 301 determines, on the basis of the information regarding the mounted objects of the seats other than the driver's seat and having been obtained during the predetermined time T(m), whether or not there is a person or a child seat (thing) having a person mounted thereon on a seat other than the driver's seat (S219). Specifically, when the vehicle controller 301 has received, at least once from the controller 201, a result that there is a person or a thing having a person mounted thereon on any of the seats, the vehicle controller 301 determines as YES in S219.

When having determined as YES in S219, the vehicle controller 301 determines that a person is left in the vehicle C, and performs notification according to the value of the variable m (S220). As shown in FIG. 11A, the notification content is different in accordance with the value of the variable m. For example, when the value of the variable m is 1, the vehicle controller 301 transmits a mail to the effect that a person is left in the vehicle C, via the wireless communication part 316 to a mail address (e.g., a mail address of a mobile phone of the driver) registered in advance. When the value of the variable m is 2, the vehicle controller 301 causes alarm sound of about 1 second long at a sound volume larger than that of the sound effect, to be outputted about 20 times from the speaker 317 toward the outside of the vehicle C. When the value of the variable m is 3, the vehicle controller 301 transmits vehicle information that includes information that a person is left in the vehicle C, the number of the vehicle C, position information of the vehicle C, and the like, via the wireless communication part 316 to police and the AAA (American Automobile Association).

With reference back to FIG. 10, when the notification process has ended, the vehicle controller 301 adds 1 to the value of the variable m (S221). On the other hand, when having determined as NO in S219, the vehicle controller 301 causes the processes of S220 and S221 to be skipped.

Subsequently, the vehicle controller 301 determines whether or not the value of the variable m is greater than a set warning number (the number of times warning is performed) (S222). In the present embodiment, as shown in FIG. 11A, the set warning number is 3. When the value of the variable m is not greater than the set warning number (S222: NO), the process is returned to S216, and the processes of S216 to S222 are performed again. When the value of the variable m is greater than the set warning number (S222: YES), all warnings are ended, and thus, the process ends.

When the process has ended, the process is executed from S211 again. When the exit condition is satisfied (S211: YES), the processes of S212 and thereafter are performed again. Since the exit condition of the present embodiment is that there is no person on the driver's seat, the process shown in FIG. 10 will be repeatedly performed as long as there is no person on the driver's seat.

Effects of Embodiment

According to the embodiment, the following effects are exhibited.

The controller 201 detects a load distribution on the detection region 1a of each load sensor 1 on the basis of an output from the load sensor 1, and discerns, on the basis of the load distribution, which of a person and a thing (child seat) the mounted object on the detection region 1a of the load sensor 1 is. When having discerned that the mounted object is a thing (child seat), the controller 201 discerns whether or not a person (child) is mounted on the thing (child seat), on the basis of temporal change in the load distribution. Thus, according to the present embodiment, that a person (child) is mounted on a thing (child seat) can also be finely discerned. Therefore, when a child is sitting on a child seat, a control with respect to the child (e.g., a control of turning off an air bag for the child) can be smoothly and appropriately performed.

Each load sensor 1 is incorporated in a predetermined target object (a seat of the vehicle C), to be used, and the controller 201 detects a load distribution while using, as a reference, a detection value of each sensor part after the load sensor 1 has been incorporated in the target object. When the load sensor 1 has been incorporated in a target object, a state where loads are applied to sensor parts is established in some cases. According to the above configuration, the load distribution is detected using the detection value in this state as a reference. Thus, the load distribution can be accurately detected.

The controller 201 obtains acceleration of the vehicle C from the acceleration sensor 315, and, on the basis of the acceleration and the total of absolute values of differences (temporal change in the load distribution), discerns whether or not a person (child) is mounted on a thing (child seat). When acceleration has occurred in the vehicle C, this acceleration acts also on a child seat, and the balance of loads applied from the child seat to the load sensor 1 changes. Therefore, even when no child is mounted on a child seat, temporal change is caused in the load distribution detected on the basis of the output from the load sensor 1. In the above configuration, acceleration is taken into consideration in addition to the load distribution. Therefore, making erroneous discernment that a child is mounted on a child seat, due to change in the load distribution caused by the acceleration, can be suppressed, and whether or not a child is mounted on a child seat can be accurately discerned.

When the acceleration of the vehicle C in a predetermined time is not less than the threshold Ath (S107 in FIG. 8: YES), the controller 201 returns the process to S106, thereby stopping discerning (S108) that a person (child) is mounted on a thing (child seat). That is, when the acceleration is large enough to cause temporal change in the load distribution, discernment that a child is mounted on a child seat is not performed. Therefore, making erroneous discernment that a child is mounted on a child seat, due to change in the load distribution caused by the acceleration, can be suppressed, and whether or not a child is mounted on a child seat can be accurately discerned.

In S109 in FIG. 8, when the controller 201 has discerned that no person (child) is mounted on the thing (child seat), the controller 201 ends the process shown in FIG. 8. Then, after a predetermined interval, the controller 201 starts the process shown in FIG. 8 again with respect to the load sensor 1. Accordingly, the controller 201 will monitor temporal change in the load distribution in S106 in FIG. 8, thereby continuing to perform discernment as to whether or not a child is mounted on a child seat. When discernment as to whether or not a child is mounted on a child seat is continuously performed, erroneous determination that no child is mounted on a child seat is inhibited from being left as is. In addition, when a child is mounted on the child seat later, that the child is on the child seat can be appropriately discerned.

When the vehicle controller 301 has determined that a person (child) is left in the vehicle C, on the basis of a detection result by the mounted object detection device 2, the vehicle controller 301 executes a control of making notification of the leaving, to the outside of the vehicle C, as shown in FIG. 11A. Accordingly, that a child or the like is left in the vehicle C can be notified of. In the present embodiment, that a child is mounted on a thing such as a child seat can also be discerned. Therefore, when a child is on a child seat and left as well, notification can be appropriately made. Therefore, safety can be further enhanced.

When a predetermined exit condition regarding exit of the driver has been satisfied (S211 in FIG. 10: YES), the vehicle controller 301 starts determination as to whether or not a person is left in the vehicle C. Therefore, when the driver has exited and the predetermined exit condition has been satisfied, determination as to whether or not a child is left is started, and thus, leaving of a child can be appropriately determined.

When the vehicle controller 301 has determined that there is no person on the driver's seat, on the basis of a detection result by the mounted object detection device 2 (S211 in FIG. 10: YES), the vehicle controller 301 determines whether or not a person is left in the vehicle C, on the basis of whether or not there is a person on a seat other than the driver's seat (S219). When there is no person on the driver's seat, it can be assumed that the vehicle C is in a parked state. Therefore, when a prerequisite condition that there is no person on the driver's seat is used for determination as to the leaving, whether or not a person is left in the vehicle C can be appropriately determined.

In a case where the vehicle controller 301 has determined that there is no person on the driver's seat, on the basis of a detection result by the mounted object detection device 2, even when the vehicle controller 301 has determined that there is no person on any of the seats other than the driver's seat, on the basis of a detection result by the mounted object detection device 2 (S219: NO), the vehicle controller 301 continues to perform determination as to whether or not a person is left in the vehicle C until the value of the variable m exceeds the set warning number. For example, in a case were a child is sleeping without moving on a child seat, it is not determined that there is a person on the child seat. In this case, if determination as to the presence/absence of the leaving is performed only when a person has exited from the driver's seat, it is determined that the leaving is absent. According to the above configuration, determination as to the presence/absence of the leaving is also performed thereafter. Thus, when the sleeping child has woken up and moved, the presence of a person (that a person is mounted on the child seat) is discerned by the mounted object detection device 2, and the vehicle controller 301 determines that a person is left in the vehicle C. Therefore, even in such a case, leaving a person can be appropriately notified of, and safety can be enhanced.

The vehicle controller 301 switches the mode of notification in accordance with the time for which a person is left in the vehicle C. Specifically, as shown in FIG. 11A, the predetermined time T(m) and the notification content are switched in accordance with the value of the variable m. Therefore, in accordance with emergency regarding the time for which the leaving is present, notification can be performed in an appropriate mode. Accordingly, safety can be enhanced.

The set warning number, the predetermined time, and the notification content are not limited to those shown in FIG. 11A, and may be those shown in FIG. 11B, for example. When the set warning number is increased, notification according to the elapsed time can be more finely performed.

The vehicle controller 301 identifies a seat in which a person (child) is on a thing (child seat), on the basis of a detection result by the mounted object detection device 2, and stops operation of the airbag for the identified seat (S207 in FIG. 9). When a child is mounted on a child seat, operation of the airbag for the seat on which the child seat is installed is stopped. Accordingly, safety for the child can be enhanced. When a child is sitting on a child seat, the child is protected by the child seat at occurrence of an impact, and thus, the air bag need not be driven.

<Modification>

The configurations of the mounted object detection device 2 and the vehicle control system 3 can be modified in various ways other than the configurations shown in the above embodiment.

For example, in the above embodiment, in S106 in FIG. 8, the total of the absolute values of differences is used as temporal change in the load distribution, and this temporal change is compared with the threshold Vth. However, the temporal change is not limited to the total of the absolute values of differences, and only needs to be a numerical value that allows detection that a person is mounted on a child seat. For example, the temporal change may be set as in modifications 1, 2 below.

FIG. 12A is a flow chart showing a process performed by the controller 201 of the mounted object detection device 2 according to modification 1. In FIG. 12A, when compared with FIG. 8, S111 is added in place of S106. For convenience, in FIG. 12A, only a part of the process is shown. In the following, the process of S111 is described.

In S111, on the basis of a current load distribution and a load distribution of a predetermined time before (e.g., 1 second before), the controller 201 calculates the position of the center of gravity of the current load distribution and the position of the center of gravity of the load distribution of the predetermined time before, and calculates the moved amount of the center of gravity, from the calculated two positions of the center of gravity.

Here, the position of the center of gravity can be obtained as follows. That is, for example, the load distribution shown in each of FIG. 6A to FIG. 6F is sectioned by a first section line parallel to the up-down direction of the figure, and a second section line parallel to the left-right direction thereof. Then, the position of the intersection of the first section line and the second section line at the time when the total values of loads calculated from the respective left and right regions sectioned by the first section line become equal to each other and the total values of loads calculated from the respective upper and lower regions sectioned by the second section line become equal to each other, is obtained. This position of the intersection can be used as the position of the center of gravity. However, the calculation method of the center of gravity is not limited thereto, and may be another calculation method as long as the point allows the balance of loads with respect to its position to be equal all around the point.

Then, using the calculated moved amount of the center of gravity as the temporal change in the load distribution, the controller 201 determines whether or not the temporal change in the load distribution is not less than a threshold Dth. When there is a person on a child seat, the position of the center of gravity changes in accordance with movement of the person. For such a case, the threshold Dth is set so as to be able to discern whether or not the person has moved on the child seat.

In a case where the moved amount of the center of gravity is not less than the threshold Dth (S111: YES), when the determination in S107 is NO, the controller 201 determines that a child is mounted on a child seat (S108). On the other hand, when the moved amount of the center of gravity is less than the threshold Dth (S111: NO), the controller 201 determines that the mounted object is a child seat (S109).

Thus, according to modification 1, whether or not there is a child on a child seat can be discerned, similar to the above embodiment.

FIG. 12B is a flow chart showing a process performed by the controller 201 of the mounted object detection device 2. In FIG. 12B, when compared with FIG. 12A, S112 is added in place of S111. In the following, the process of S112 is described.

In S112, the controller 201 calculates, as one period, the time that is necessary for the position of the center of gravity of the load distribution to move by a predetermined amount (e.g., 10 cm) on the detection region 1a, and, on the basis of the calculated one period, the controller 201 calculates the frequency (reciprocal of one period) regarding movement of the mounted object. Then, using the calculated frequency regarding the movement as temporal change in the load distribution, the controller 201 determines whether or not the temporal change in the load distribution is not greater than a threshold Fth. When there is a person on a child seat, the frequency regarding the movement is about 1 Hz in the left-right direction of the vehicle C and about 3 to 5 Hz in the front-rear direction of the vehicle C. For such a case, the threshold Fth is set so as to be able to discern whether or not a person has moved on the child seat. The threshold Fth is 10 Hz, for example.

In a case where the frequency regarding the movement is not greater than the threshold Fth (S112: YES), when the determination in S107 is NO, the controller 201 determines that a child is mounted on a child seat (S108). On the other hand, when the frequency regarding the movement is greater than the threshold Fth (S112: NO), the controller 201 determines that the mounted object is a child seat (S109). In a case where the mounted object is a child seat, the position of the center of gravity does not move, and thus, the above-described period cannot be obtained. In this case, the controller 201 sets the determination in S112 to be NO, and determines that the mounted object is a child seat.

Here, there are cases where temporal change occurs in the load distribution as a result of vibration or the like being transmitted to a child seat (thing). On the other hand, movement of a child (person) mounted on a child seat is normally not greater than 10 Hz. Therefore, according to the above configuration, when temporal change has occurred in the load distribution, not due to movement of a child but due to transmission of vibration or the like, making erroneous discernment that a child is mounted on a child seat, on the basis of this temporal change, can be prevented. Therefore, according to modification 2, a situation where a child is mounted on a child seat can be more accurately discerned.

In the above embodiment, in S107 in FIG. 8, whether or not acceleration of the vehicle C in a predetermined time is not less than the threshold Ath is determined. However, the determination in S107 may be modified as in modification 3 below, for example.

FIG. 13A is a flow chart showing a process performed by the controller 201 of the mounted object detection device 2. In FIG. 13A, when compared with FIG. 8, S113 is added in place of S107. In the following, the process of S113 is described.

In S113, the controller 201 obtains the direction in which the position of the center of gravity of the load distribution moves on the detection region 1a, as temporal change in the load distribution based on the output from the load sensor 1. In addition, on the basis of acceleration of the vehicle C obtained from the acceleration sensor 315, the controller 201 obtains the direction in which the loads move due to the acceleration, as temporal change in the load distribution based on the acceleration. Specifically, on the basis of the output from the acceleration sensor 315, the controller 201 obtains the direction of the acceleration applied to the mounted object, and obtains this direction as the direction in which the loads move due to the acceleration. In modification 3, the acceleration sensor 315 can detect not only the acceleration but also the direction of the acceleration. Then, the controller 201 determines whether or not the moving direction of the position of the center of gravity of the load distribution matches the direction in which the loads move due to the acceleration.

Here, in a case where acceleration is occurring in the vehicle C, even when no person is mounted on the child seat, the position of the center of gravity of the child seat moves in a direction corresponding to the acceleration. Therefore, in modification 3, even in a case where it has been determined in S106 that temporal change in the load distribution has occurred, when the moving direction of the position of the center of gravity matches the direction in which the loads move due to the acceleration (S113: YES), the process is returned to S106 in order to avoid inaccurate determination. On the other hand, when the moving direction of the position of the center of gravity does not match the direction in which the loads move due to the acceleration (S113: NO), it is considered that the movement of the position of the center of gravity is due to a person on the child seat. Thus, the controller 201 determines that a person is mounted on the child seat (S108).

As described above, when temporal change in the load distribution based on the output of the load sensor 1 matches temporal change in the load distribution caused by acceleration, it is not determined that a person is mounted on a thing (child seat). Therefore, making erroneous discernment that a person is mounted on a child seat, due to change in the load distribution caused by the acceleration, can be suppressed, and whether or not a person is mounted on a child seat can be accurately discerned.

In the above embodiment, in S107 in FIG. 8, for determination as to whether or not acceleration is occurring in the vehicle C, acceleration obtained from the acceleration sensor 315 provided in the vehicle C is used. However, whether or not acceleration is occurring in the vehicle C may be determined by another means. For example, as in modification 4 below, whether or not acceleration is occurring in the vehicle C may be determined on the basis of outputs from a plurality of load sensors 1.

FIG. 13B is a flow chart showing a process performed by the controller 201 of the mounted object detection device 2 according to modification 4. In FIG. 13B, when compared with FIG. 8, S114 is added in place of S107. In the following, the process of S114 is described.

In S114, with respect to each of all of the load sensors 1 for which the mounted object has been determined to be a child seat or a child seat having a person mounted thereon, the controller 201 obtains the moving direction of the center of gravity in the load sensor 1, as temporal change in the load distribution, on the basis of the output of the load sensor 1. Then, the controller 201 determines whether or not the moving directions (temporal change in the load distribution) of the center of gravity obtained on the basis of the respective load sensors 1 match each other.

Figure 14A:
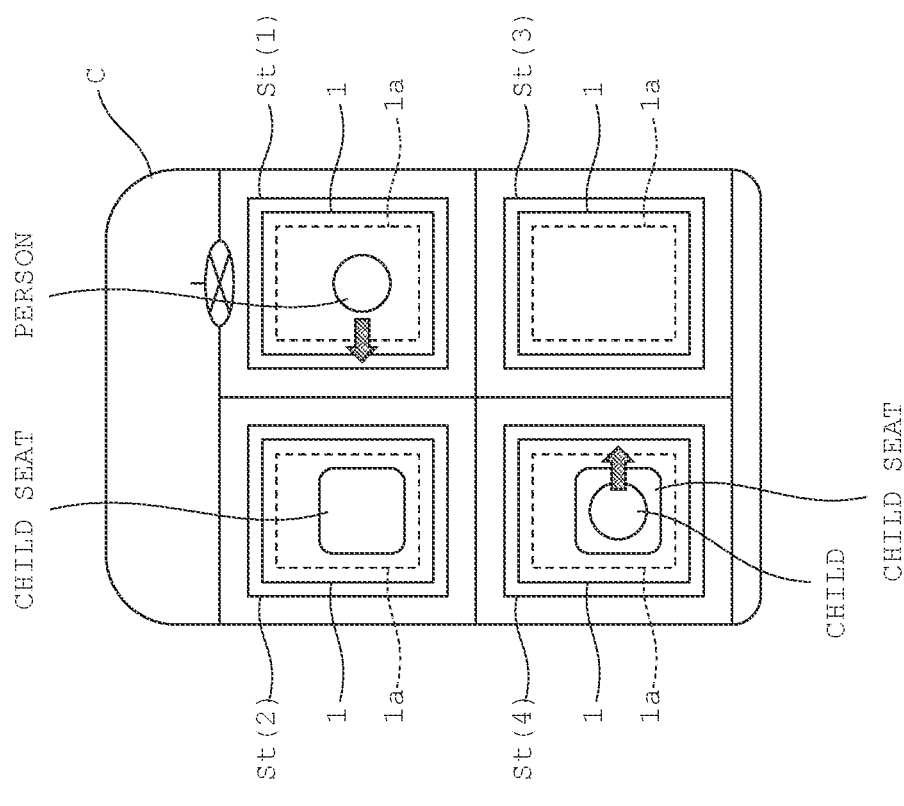
FIG. 14A schematically shows that changes in loads due to acceleration are occurring when acceleration is occurring in a vehicle, according to modification 4.
Figure 14B:
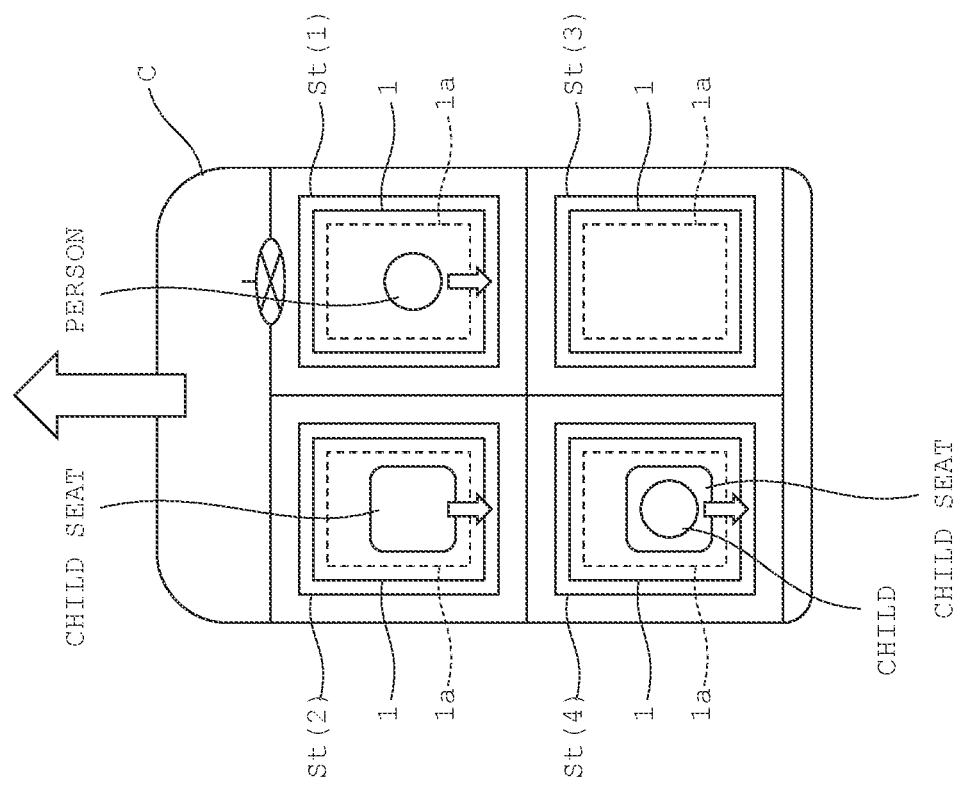
FIG. 14B schematically shows that changes in loads due to acceleration are not occurring when acceleration is not occurring in a vehicle, according to modification 4.

Here, when acceleration is occurring in the vehicle C, change in the loads due to the acceleration occurs in all of the load sensors 1 on which a thing is present, as shown in FIG. 14A. In the example shown in FIG. 14A, a thing is mounted on each of the seats St(1), St(2), St(4), and thus, in the load sensors 1 of these seats, changes in the loads occur in substantially the same direction. In this case, in each of the seats St(1), St(4), change in the loads may occur in accordance with movement of a person. However, in the change in the loads detected by the load sensor 1, acceleration of the vehicle C is dominant. Meanwhile, when acceleration is not occurring in the vehicle C, change in the loads due to acceleration of the vehicle C does not occur in any of the load sensors 1 on which a thing is present, as shown in FIG. 14B. In the example shown in FIG. 14B, since acceleration is not occurring in the vehicle C, there is no change in the loads in the seat St(2), and changes in the loads that do not match each other are occurring only in accordance with movements of persons, in the seats St(1), St(4).

Therefore, when the moving directions of the center of gravity obtained on the basis of the respective load sensors 1 on which a thing is present match each other (S114: YES), it can be determined that acceleration is occurring in the vehicle C. In this case, similar to S107 of the above embodiment, the process is returned to S106 in order to suppress making erroneous discernment that a child is mounted on a child seat, due to the change in the load distribution caused by the acceleration. On the other hand, when the moving directions of the center of gravity obtained on the basis of the respective load sensors 1 on which a thing is present do not match each other (S114: NO), it can be determined that acceleration is not occurring in the vehicle C. In this case, the controller 201 determines that the mounted object is a child seat having a child mounted thereon (S108).

Thus, according to modification 4, when temporal change in the load distribution of one load sensor 1 on which a thing (child seat) is mounted does not match temporal change in the load distribution of another load sensor 1 on which a thing (child seat) is mounted, it can be presumed that a person (child) is mounted on the one load sensor 1 and specific temporal change in the load distribution has occurred due to the behavior of the person (child). Therefore, as in the above configuration, when temporal change in the load distribution according to one load sensor 1 is checked against temporal change in the load distribution according to another load sensor 1, it is possible to discern whether or not a person is mounted on the thing that is mounted on the one load sensor 1.

In the above embodiment, the controller 201 of the mounted object detection device 2 detects the situation of a mounted object on each load sensor 1. However, when no controller is provided to the mounted object detection device 2, the vehicle controller 301 on the vehicle C side connected to the mounted object detection device 2 may detect the situation of a mounted object on the load sensor 1. Alternatively, the controller 201 on the mounted object detection device 2 side and the vehicle controller 301 on the vehicle C side may detect the situation of a mounted object on the load sensor 1, in cooperation with each other.

In the above embodiment, in S103 to S105 in FIG. 8, the controller 201 determines whether or not the mounted object is a person, on the basis of the output from the load sensor 1. However, not limited thereto, when having determined that the mounted object is a person, the controller 201 may further determine which of a child and an adult the person is, on the basis of the shape or area of the distribution of the loads.

In the above embodiment, the load sensor 1 detects the load distribution on the basis of each reference value (initial load) at the time when the load sensor 1 is incorporated in a seat. However, not limited thereto, after the load sensor 1 has been incorporated in a seat, the reference value of the load sensor 1 may be updated at a predetermined timing in a state where no mounted object is present in the detection region 1*a*.

In the above embodiment, a load obtained by subtracting an initial load from the load calculated on the basis of an output from each sensor part of the load sensor 1 is used in the process in FIG. 8. However, not limited thereto, when it is assumable that the initial load is small, measurement of the initial load and storing of a reference value corresponding to the initial load may be omitted, and the load actually calculated may be used in the process in FIG. 8.

In the above embodiment, the process in FIG. 8 is consecutively repeated. However, the process in FIG. 8 may be ended after having been consecutively repeated for a predetermined time (e.g., 10 minutes, 30 minutes, or 1 hour), and thereafter, may be performed in accordance with calling of the first process and the second process by the vehicle controller 301. In the above embodiment, the process in FIG. 8 is executed at an interval of 1/40 seconds. However, not limited thereto, the process in FIG. 8 may be executed at an interval of 10 minutes, or at an interval of 1 hour.

In the above embodiment, the load sensor 1 is installed in all of the seats in the vehicle C. However, not limited thereto, the load sensor 1 may be installed in only some seats in the vehicle C, and for example, may be installed in the driver's seat and the seats corresponding to the number of people of a family.

In the above embodiment, in S219 in FIG. 10, the vehicle controller 301 determines whether or not there is person or a child seat (thing) having a person mounted thereon on a seat other than the driver's seat, but the vehicle controller 301 may determine only whether or not there is a child seat having a person mounted thereon. In this case, for example, the determination in S219 does not become YES on the basis of the fact that there is an adult sitting on a passenger seat or a rear seat, and thus, notification that a person is left can be made to the outside, only on the basis of a child sitting on the child seat.

In the above embodiment, in S101 and S106 in FIG. 8, determination is performed on the basis of the load calculated from the detection value of each sensor part of the load sensor 1. However, not limited thereto, a numerical value corresponding to the load may be used. For example, the determination may be performed on the basis of a detection value (voltage value) of each sensor part, or the determination may be performed on the basis of capacitance calculated from the detection value of each sensor part.

In the above embodiment, in the second process shown in FIG. 10, after it has been determined as YES in S222, the process is performed again from S211. However, not limited thereto, after it has been determined as YES in S222, notification that has been performed last may be consecutively performed at a predetermined interval. For example, a process of transmitting vehicle information to police and the AAA may be performed every 1 hour, and output of alarm sound may be performed together with this notification.

In the above embodiment, in S219 in FIG. 10, it is determined as YES when a result that there is a person or a thing having a person mounted thereon on any of the seats is obtained at least once during the predetermined time T(m). However, not limited thereto, it may be determined as YES when a result that there is a person or a thing having a person mounted thereon is obtained on the basis of the state of each seat obtained immediately before the determination in S219. However, a case where a child is sleeping without moving on a child seat and has moved only once in the predetermined time T(m) is also assumable. Therefore, it is preferable that determination is made on the basis of the state of each seat over the predetermined time T(m), as in the above embodiment.

In the above embodiment, the wireless communication part for transmitting a mail and vehicle information to the outside is provided on the vehicle C side. However, the wireless communication part may be provided to the mounted object detection device 2. In this case, for example, the vehicle controller 301 transmits a transmission instruction including a mail or vehicle information to the controller 201 of the mounted object detection device 2, and the controller 201 having received the transmission instruction transmits, to the outside, the mail or the vehicle information via the wireless communication part provided to the mounted object detection device 2.

In the above embodiment and modifications, in S220 in FIG. 10, that a person is left in the vehicle C is notified of by the means shown in FIG. 11A and FIG. 11B. However, the notification means is not limited thereto. For example, the notification may be made by lighting of a direction indicator (winker) of the vehicle C or by lighting a head lamp of the vehicle C. Alternatively, another speaker may be provided to the vehicle C, and from the other speaker, a message that "there is a possibility that a child is left" may be outputted as sound toward the outside of the vehicle C, whereby the notification may be made.

In the above embodiment, the number of sensor parts arranged in a matrix shape is 3×3=9 in the case of FIG. 4, and is 32×32=1024 in the cases of FIG. 6A to FIG. 6F. However, not limited thereto, the numbers of sensor parts arranged in the vertical direction and the horizontal direction only need to be not less than two.

In the above embodiment, the mounted object detection device 2 is installed in the vehicle C. However, not limited thereto, the mounted object detection device 2 may be installed in another target object (e.g., a train, a bus, a bench of a facility) or a system. The mounted object to be discerned as a thing is not limited to a child seat, and may be another thing as long as the thing can have a person mounted thereon.

In the above embodiment, which of a person and a child seat the mounted object is, is discerned. However, not limited thereto, which of a person or animal and a thing (a child seat or an animal carrier bag) the mounted object is, may be discerned.

In this case, determination that the mounted object is an animal can be performed on the basis of the weight distribution (AI, matching degree with a typical weight distribution), similar to the case of a person. Further, determination that an animal is mounted in a thing (animal carrier bag) can also be performed on the basis of temporal change in the weight distribution and acceleration in a predetermined time, similar to the case of a person.

When an animal is included as the determination target of the mounted object, it can be presumed that it is difficult to determine the kind (child seat/animal carrier bag) of a thing and the kind (child/animal) of the target object mounted on the thing. Therefore, in the controls in FIG. 9 and FIG. 10, without distinguishing which of a person and an animal is mounted on a thing in particular, turning on/off an air bag and notification of in-vehicle leaving may be performed. In this case, in step S108 in FIG. 8, it is determined that the mounted object is a thing having a person or an animal mounted thereon. Then, in association with this determination, the determination in step S205 in FIG. 9 becomes NO, whereby the air bag is set to be off, and the determinations in steps S213, S219 in FIG. 10 become YES, whereby output of a sound effect and notification of in-vehicle leaving are performed.

In a case where the mounted object is a person or an animal as well, in the controls in FIG. 9 and FIG. 10, distinguishing between a person and an animal need not necessarily be performed. In this case, in steps 3103, S104, S105 in FIG. 8, whether or not the mounted object is a person or an animal is determined. Then, when the mounted object has been determined to be a person or an animal, the determination in step S205 in FIG. 9 becomes YES, whereby the air bag is set to be on, and the determinations in steps S213, S219 in FIG. 10 become YES, whereby output of a sound effect and notification of in-vehicle leaving are performed.

In a case where which of a person and an animal the mounted object is can be discerned on the basis of the weight distribution (AI, matching degree with a typical weight distribution), a different control may be performed depending on whether the mounted object is a person or an animal. For example, when the mounted object is a person, the determination in step S205 in FIG. 9 may become YES, whereby the air bag may be set to be on, and when the mounted object is an animal, the determination in step S205 in FIG. 9 may become NO, whereby the air bag may be set to be off. The determination target is not limited to a person or an animal, and may be an animal only.

In addition to the above, various modifications can be made as appropriate to the embodiments of the present invention without departing from the scope of the technical idea defined by the claims.

What is claimed is:

1. A mounted object detection device comprising:
   a load sensor in which a plurality of sensor parts each configured to detect a load are disposed in a matrix shape; and
   a controller configured to detect a situation of a mounted object on the load sensor based on an output from the load sensor, wherein
   the controller
      detects a load distribution on a detection region of the load sensor based on an output from the load sensor,
      discerns which of a person or animal and a thing the mounted object is, based on the load distribution,
      when having discerned that the mounted object is a thing, discerns whether or not a person or an animal is mounted on the thing, based on a temporal change in the load distribution, and
      when the temporal change in the load distribution is not greater than 10 Hz, determines that a person or an animal is mounted to the thing.

2. The mounted object detection device according to claim 1, wherein
   the load sensor is incorporated in a predetermined target object, to be used, and
   the controller detects the load distribution using, as a reference, a detection value of each sensor part after the load sensor has been incorporated in the target object.

3. The mounted object detection device according to claim 1, wherein
   after the controller has discerned that no person or animal is mounted on the thing, the controller monitors the temporal change in the load distribution, and continues to perform discernment as to whether or not a person or an animal is mounted on the thing.

4. A mounted object detection device comprising:
   a load sensor installed in a moving body, in which a plurality of sensor parts each configured to detect a load are disposed in a matrix shape; and
   a controller configured to detect a situation of a mounted object on the load sensor based on an output from the load sensor, wherein
   the controller
      obtains information regarding acceleration of the moving body,
      detects a load distribution on a detection region of the load sensor based on an output from the load sensor,
      discerns which of a person or animal and a thing the mounted object is, based on the load distribution,
      when having discerned that the mounted object is a thing, discerns whether or not a person or an animal is mounted on the thing, based on the information regarding the acceleration and a temporal change in the load distribution, and
      when a temporal change in the load distribution based on an output from the load sensor does not match a temporal change in the load distribution caused by the acceleration, discerns that a person or an animal is mounted on the thing.

5. A mounted object detection device comprising:
   a load sensor installed in a moving body, in which a plurality of sensor parts each configured to detect a load are disposed in a matrix shape; and
   a controller configured to detect a situation of a mounted object on the load sensor based on an output from the load sensor, wherein
   the controller
      obtains information regarding acceleration of the moving body,
      detects a load distribution on a detection region of the load sensor based on an output from the load sensor,
      discerns which of a person or animal and a thing the mounted object is, based on the load distribution,
      when having discerned that the mounted object is a thing, discerns whether or not a person or an animal is mounted on the thing, based on the information regarding the acceleration and a temporal change in the load distribution, and
      when the acceleration is not less than a threshold, stops discerning that a person or an animal is mounted on the thing.

6. A mounted object detection device comprising:
   a load sensor installed in each seat of a vehicle, in which a plurality of sensor parts each configured to detect a load are disposed in a matrix shape; and
   a controller configured to detect a situation of a mounted object on the load sensor based on an output from the load sensor, wherein
   the controller
      detects a load distribution on a detection region of the load sensor based on an output from the load sensor,
      discerns which of a person or animal and a thing the mounted object is, based on the load distribution, and
      when having discerned that the mounted object is a thing, discerns whether or not a person or an animal is mounted on the thing, based on a temporal change in the load distribution, and
      in the discernment as to whether or not a person or an animal is mounted on the thing, the controller based on an output from a first load sensor for which a mounted object has been discerned to be a thing, obtains a first temporal change in a load distribution in the first load sensor, based on an output from a second load sensor, as another load sensor, for which a mounted object has been discerned to be a thing, obtains a second temporal change in a load distribution in the second load sensor, and based on a fact that the first temporal change and the second temporal change do not match each other, discerns that a person or an animal is mounted on a thing on the first load sensor.

7. A vehicle control system comprising:

a mounted object detection device; and a vehicle controller configured to perform a predetermined control with respect to a vehicle, wherein the mounted object detection device includes a load sensor in which a plurality of sensor parts each configured to detect a load are disposed in a matrix shape; and a controller configured to detect a situation of a mounted object on the load sensor based on an output from the load sensor, the controller detects a load distribution on a detection region of the load sensor based on an output from the load sensor, discerns which of a person or animal and a thing the mounted object is, based on the load distribution, and when having discerned that the mounted object is a thing, discerns whether or not a person or an animal is mounted on the thing, based on a temporal change in the load distribution, the load sensor is installed in a seat of the vehicle, and when the vehicle controller has determined that a person or an animal is left in the vehicle, based on a detection result by the mounted object detection device, the vehicle controller executes a control of making notification that a person or an animal is left in the vehicle, to outside of the vehicle.

8. The vehicle control system according to claim 7, wherein when a predetermined exit condition regarding exit of a driver has been satisfied, the vehicle controller starts determination as to whether or not a person or an animal is left in the vehicle.

9. The vehicle control system according to claim 7, wherein when the vehicle controller has determined that there is no person on a driver's seat, based on a detection result by the mounted object detection device, the vehicle controller determines whether or not a person or an animal is left in the vehicle, based on whether or not there is a person or an animal on a seat other than the driver's seat.

10. The vehicle control system according to claim 9, wherein in a case where the vehicle controller has determined that there is no person on the driver's seat, based on a detection result by the mounted object detection device, even when the vehicle controller has determined that there is no person or animal on a seat other than the driver's seat, based on a detection result by the mounted object detection device, the vehicle controller continues to perform determination as to whether or not a person or an animal is left in the vehicle.

11. The vehicle control system according to claim 7, wherein the vehicle controller switches a mode of notification in accordance with a time for which a person or an animal is left in the vehicle.

12. A vehicle control system comprising:

a mounted object detection device, and a vehicle controller configured to perform a predetermined control with respect to a vehicle, wherein the mounted object detection device includes a load sensor in which a plurality of sensor parts each configured to detect a load are disposed in a matrix shape, and a controller configured to detect a situation of a mounted object on the load sensor based on an output from the load sensor, the controller detects a load distribution on a detection region of the load sensor based on an output from the load sensor, discerns which of a person or animal and a thing the mounted object is, based on the load distribution, when having discerned that the mounted object is a thing, discerns whether or not a person or an animal is mounted on the thing, based on a temporal change in the load distribution, and when the temporal change in the load distribution is not greater than 10 Hz, determines that a person or an animal is mounted on the thing, the load sensor is installed in a seat of the vehicle, and the vehicle controller identifies a seat in which a person or an animal is on a thing, based on a detection result by the mounted object detection device, and stops operation of an airbag for the identified seat.

* * * * *